United States Patent
Ubhi

(10) Patent No.: US 12,516,730 B1
(45) Date of Patent: Jan. 6, 2026

(54) ELECTRO-HYDRAULIC CIRCUITS INCORPORATING DUAL PUMPS FOR IMPROVED CLUTCH FILL TIMES, TRANSMISSIONS AND VEHICLES INCORPORATING THE SAME, AND METHODS ASSOCIATED THEREWITH

(71) Applicant: ALLISON TRANSMISSION, INC., Indianapolis, IN (US)

(72) Inventor: Upkar Singh Ubhi, Greenwood, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 18/883,130

(22) Filed: Sep. 12, 2024

(51) Int. Cl.
*F16H 61/02* (2006.01)
*F16H 61/00* (2006.01)

(52) U.S. Cl.
CPC ..... *F16H 61/0206* (2013.01); *F16H 61/0031* (2013.01); *F16H 2200/0021* (2013.01)

(58) Field of Classification Search
CPC ............ F16H 61/0206; F16H 61/0031; F16H 2200/0021; F16H 2061/0209; F16H 61/061; F16H 610/0206; B60W 10/02; B60W 10/023; B60W 10/10
USPC ........ 701/67, 51, 66; 475/99, 100, 101, 137, 475/120, 128
See application file for complete search history.

(56) References Cited

U.S. PATENT DOCUMENTS

| | | | |
|---|---|---|---|
| 6,358,174 B1 | 3/2002 | Folsom et al. | |
| 7,896,769 B2 | 3/2011 | Long et al. | |
| 8,280,599 B2* | 10/2012 | Suzuki | B60W 30/18072 701/55 |
| 9,080,618 B2* | 7/2015 | Kawakami | B60K 6/48 |
| 9,097,338 B2 | 8/2015 | Hagelskamp | |
| 2002/0107103 A1* | 8/2002 | Nakamori | B60K 6/365 475/116 |
| 2008/0227599 A1* | 9/2008 | Takagi | F16H 61/0021 477/115 |
| 2009/0258756 A1 | 10/2009 | Long et al. | |

(Continued)

FOREIGN PATENT DOCUMENTS

| BR | 198504771 A | 7/1986 |
|---|---|---|
| BR | 199708773 A | 8/1999 |

(Continued)

*Primary Examiner* — Roger L Pang
(74) *Attorney, Agent, or Firm* — Taft Stettinius & Hollister LLP; Stephen F. Rost

(57) ABSTRACT

Vehicles, transmissions for vehicles, and methods of operating transmissions are envisioned. A vehicle includes a chassis, a plurality of wheels coupled to the chassis, and a transmission mounted to the chassis. The transmission includes at least one torque-transmitting mechanism selectively engageable in response to one or more fluids pressures applied thereto, a first pump to selectively deliver fluid pressure to the at least one torque-transmitting mechanism at a first pressure, a second pump to selectively deliver fluid pressure to the at least one torque-transmitting mechanism at a second pressure greater than the first pressure, and an electro-hydraulic control system to control delivery of fluid pressure from the first and second pumps to the at least one torque-transmitting mechanism in a plurality of operating modes of the transmission.

18 Claims, 12 Drawing Sheets

(56) References Cited

U.S. PATENT DOCUMENTS

| | | | | |
|---|---|---|---|---|
| 2012/0199217 | A1* | 8/2012 | Long | F16H 61/6649 137/468 |
| 2014/0157766 | A1* | 6/2014 | Baraga | F16D 1/10 60/435 |
| 2015/0167836 | A1* | 6/2015 | Long | F16H 61/0206 903/902 |
| 2024/0003418 | A1* | 1/2024 | Bedert | F16H 61/0009 |

FOREIGN PATENT DOCUMENTS

| CA | 2753965 | C | 4/2018 |
|---|---|---|---|
| CN | 1157548 | C | 7/2004 |
| CN | 101561021 | B | 1/2011 |
| CN | 102734457 | A | 10/2012 |
| CN | 104813056 | A | 7/2015 |
| CN | 102713368 | B | 6/2016 |
| CN | 105882742 | A | 8/2016 |
| CN | 106218619 | A | 12/2016 |
| CN | 205769554 | U | 12/2016 |
| CN | 205971268 | U | 2/2017 |
| CN | 107258196 | A | 10/2017 |
| CN | 206948900 | U | 2/2018 |
| CN | 108032901 | A | 5/2018 |
| CN | 108170084 | A | 6/2018 |
| CN | 108170104 | A | 6/2018 |
| CN | 108501944 | A | 9/2018 |
| CN | 108715163 | A | 10/2018 |
| CN | 109572440 | A | 4/2019 |
| DE | 3211630 | C2 | 7/1993 |
| DE | 19504935 | A1 | 8/1995 |
| EP | 304919 | B1 | 6/1995 |
| EP | 1029183 | A1 | 8/2000 |
| EP | 2401527 | A1 | 1/2012 |
| FR | 2716516 | B1 | 2/1999 |
| FR | 2764664 | B1 | 6/2002 |
| GB | 2320534 | A9 | 7/1998 |
| IN | 201107250 | P1 | 2/2013 |
| JP | 2001522974 | A | 11/2001 |
| KR | 2011131195 | A | 12/2011 |
| TW | 200610666 | A | 4/2006 |
| WO | 1999024738 | A1 | 5/1999 |
| WO | 2010099286 | A1 | 9/2010 |
| WO | 2019218097 | A1 | 11/2019 |
| WO | 2019218098 | A1 | 11/2019 |

* cited by examiner

ELECTRO-HYDRAULIC CIRCUITS INCORPORATING DUAL PUMPS FOR IMPROVED CLUTCH FILL TIMES, TRANSMISSIONS AND VEHICLES INCORPORATING THE SAME, AND METHODS ASSOCIATED THEREWITH

FIELD OF THE DISCLOSURE

The present disclosure relates, generally, to a transmission for vehicles, and, more specifically, to a transmission incorporating an electro-hydraulic circuit including multiple pumps.

BACKGROUND

In some configurations, a single pump may be employed to selectively deliver fluid pressure to one or more clutches of a transmission. In some cases, the use of a single pump to deliver fluid pressure to one or more clutches may be associated with undesirable cost and/or clutch fill times. Systems, devices, and/or methods for delivering fluid pressure to one or more clutches that avoid drawbacks associated with such configurations remain an area of interest.

SUMMARY

The present disclosure may comprise one or more of the following features and combinations thereof.

According to one aspect of the present disclosure, a vehicle may include a chassis, a plurality of wheels coupled to the chassis, and a transmission coupled to the chassis including an electro-hydraulic circuit. The electro-hydraulic circuit may include at least one torque-transmitting mechanism, a first pump, a second pump, and an electro-hydraulic control system. The at least one torque-transmitting mechanism may be selectively engageable in response to one or more fluid pressures applied thereto. The first pump may selectively deliver fluid pressure to the at least one torque-transmitting mechanism at a first pressure. The second pump may selectively deliver fluid pressure to the at least one torque-transmitting mechanism at a second pressure greater than the first pressure. The electro-hydraulic control system may control delivery of fluid pressure from the first pump and the second pump to the at least one torque-transmitting mechanism in a plurality of operating modes of the transmission. The electro-hydraulic control system may include a controller having a processor and memory having instructions stored therein. The instructions may be executable by the processor to cause the processor to (i) direct delivery of fluid pressure at the first pressure from the first pump to the at least one torque-transmitting mechanism during a first phase of a multi-phase transition from one operating mode of the transmission to another operating mode of the transmission and (ii) direct delivery of fluid pressure at the second pressure from the second pump to the at least one torque-transmitting mechanism during a second phase of the multi-phase transition following the first phase.

In some embodiments, during the multi-phase transition, the first pressure may be delivered by the first pump to the at least one torque-transmitting mechanism at a first flow rate and the second pressure may be delivered by the second pump to the at least one torque-transmitting mechanism at a second flow rate that is less than the first flow rate. Additionally, in some embodiments, each of the first and second pumps may be an electric pump. The vehicle may be an electric vehicle.

In some embodiments, the multi-phase transition may include three discrete phases. The instructions may be executable by the processor to cause the processor to direct performance of a third phase of the multi-phase transition before performance of the first and second phases. The instructions may be executable by the processor to cause the processor to direct exhaustion of the at least one torque-transmitting mechanism during the third phase of the multi-phase transition.

In some embodiments, the at least one torque-transmitting mechanism may include a plurality of clutches. The instructions may be executable by the processor to cause the processor to direct exhaustion of at least one of the plurality of clutches during each of the first and second phases of the multi-phase transition.

In some embodiments, the electro-hydraulic circuit may include one trim system having a pressure control solenoid and a trim valve having a valve element configured for axial translation in response to one or more control signals provided from the controller to the pressure control solenoid, and the vehicle may include no more than one trim system. The instructions may be executable by the processor to cause the processor to energize the pressure control solenoid such that the trim valve is in a stroked position in each of the phases of the multi-phase transition.

According to another aspect of the present disclosure, a transmission may include an electro-hydraulic circuit. The electro-hydraulic circuit may include at least one torque-transmitting mechanism, a first pump, a second pump, and an electro-hydraulic control system. The at least one torque-transmitting mechanism may be selectively engageable in response to one or more fluid pressures applied thereto. The first pump may selectively deliver fluid pressure to the at least one torque-transmitting mechanism at a first pressure. The second pump may selectively deliver fluid pressure to the at least one torque-transmitting mechanism at a second pressure greater than the first pressure. The electro-hydraulic control system may include a controller having a processor and memory having instructions stored therein. The instructions may be executable by the processor to cause the processor to (i) direct delivery of fluid pressure at the first pressure from the first pump to the at least one torque-transmitting mechanism during a first phase of a multi-phase transition from one operating mode of the transmission to another operating mode of the transmission and (ii) direct delivery of fluid pressure at the second pressure from the second pump to the at least one torque-transmitting mechanism during a second phase of the multi-phase transition.

In some embodiments, during the multi-phase transition, the first pressure may be delivered by the first pump to the at least one torque-transmitting mechanism at a first flow rate, and the second pressure may be delivered by the second pump to the at least one torque-transmitting mechanism at a second flow rate that is less than the first flow rate. Additionally, in some embodiments, each of the first and second pumps may be an electric pump. Further, in some embodiments still, the instructions may be executable by the processor to cause the processor to direct performance of a third phase of the multi-phase transition before performance of the first and second phases.

In some embodiments, the at least one torque-transmitting mechanism may include a first clutch, a second clutch, and a third clutch, and only one of the first clutch, the second clutch, and the third clutch may be a one-way clutch. Additionally, in some embodiments, the electro-hydraulic circuit may include one trim system having a pressure control solenoid and a trim valve having a valve element configured for axial translation in response to one or more control signals provided from the controller to the pressure control solenoid.

According to another aspect of the present disclosure, a method of operating a transmission may include delivering, during a first phase of a multi-phase transition from one operating mode of the transmission to another operating mode of the transmission, fluid pressure from a first pump of an electro-hydraulic circuit of the transmission to at least one torque-transmitting mechanism of the electro-hydraulic circuit at a first pressure and at a first flow rate. The method may also include delivering, during a second phase of the multi-phase transition following the first phase, fluid pressure from a second pump of the electro-hydraulic circuit to the at least one torque-transmitting mechanism at a second pressure greater than the first pressure and at a second flow rate less than the first flow rate.

In some embodiments, the method may include exhausting, during a pre-shift phase of the multi-phase transition prior to each of the first and second phases, the at least one torque-transmitting mechanism. The multi-phase transition may include three discrete phases.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
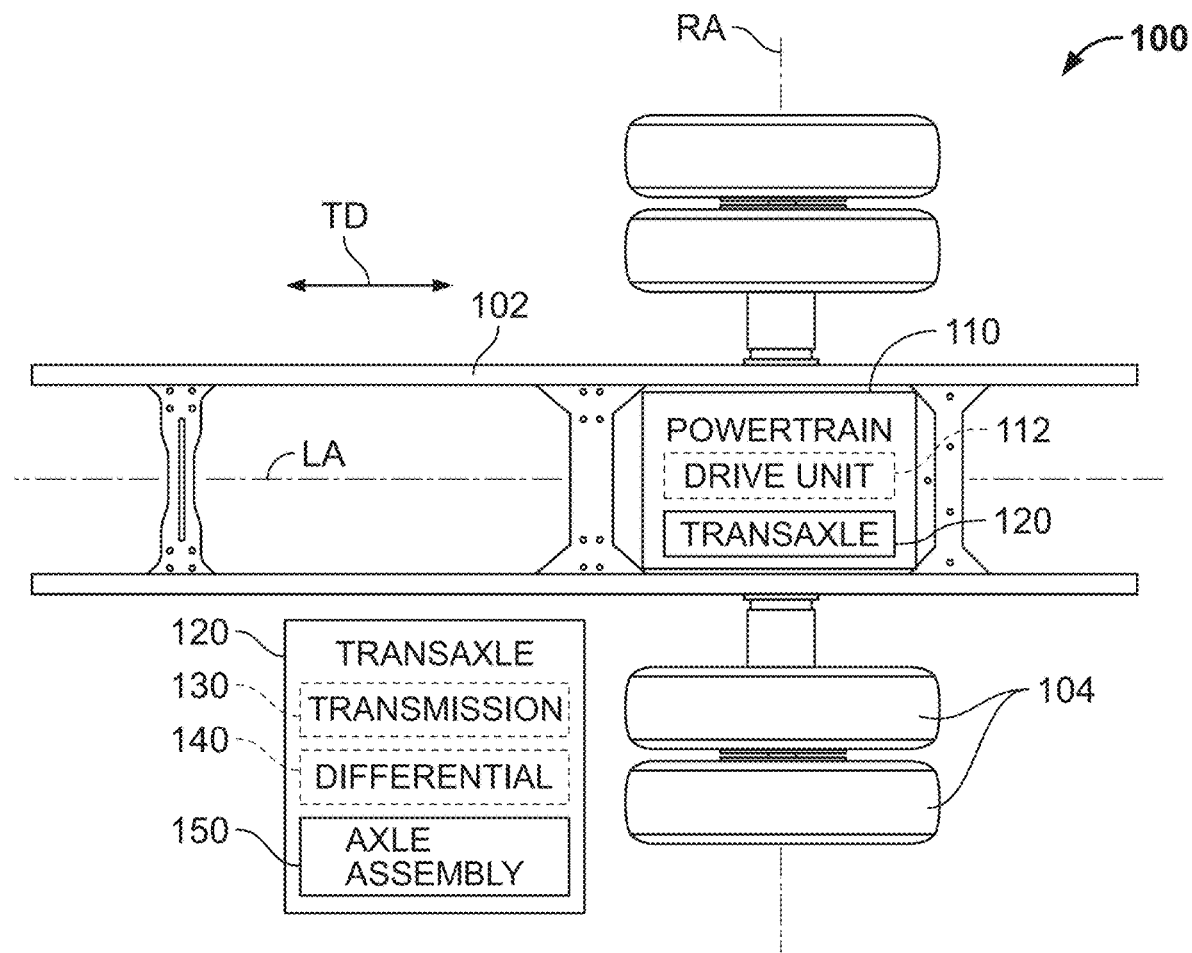
FIG. 1 is a partial diagrammatic depiction of a powertrain adapted for use in a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for case of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative vehicle 100 includes a chassis or main frame 102, wheels 104 coupled to the chassis 102 and each configured for rotation about a rotational axis RA, and a powertrain 110 mounted to the chassis 102. In the illustrative embodiment, the powertrain 110 is embodied as, or otherwise includes, a collection of devices that are cooperatively capable of generating and transmitting rotational power to the wheels 104 of the vehicle 100 to propel the vehicle 100 in use thereof. In some embodiments, the powertrain 110 is mounted to the chassis 102 transverse to a longitudinal axis LA along which the chassis 102 extends. In those embodiments, the powertrain 110 is arranged transverse to a travel direction TD of the vehicle 100, and the powertrain 110 may be said to have a transverse mounting arrangement relative to the chassis 102. In other embodiments, however, the powertrain 110 may be mounted to the chassis 102 in another suitable manner.

In the illustrative embodiment, the powertrain 110 includes a drive unit 112 (shown in phantom in FIG. 1) to generate rotational power. The drive unit 112 may be embodied as, or otherwise include, any device or collection of devices capable of generating rotational power that may be transmitted to the wheels 104 to drive movement of the vehicle 100. The illustrative drive unit 112 is embodied as, or otherwise includes, one or more electric motors. Because the powertrain 110 incorporates one or more electric motors or powerplants, at least in some embodiments, the vehicle 100 is embodied as, or otherwise includes, an electric vehicle. In one example, the vehicle 100 is embodied as, or otherwise includes, a medium or heavy-duty electric truck or electric bus, and the powertrain 110 is employed in lieu of one or more conventional powertrain(s) associated with one or more internal combustion engine configuration(s). In any case, operation of the drive unit 112 may be controlled by an engine control module (not shown) that includes one or more processors and one or more memory devices.

The illustrative powertrain 100 also includes a transaxle 120 coupled to the drive unit 112 to receive rotational power therefrom and transmit rotational power to the wheels 104. The transaxle 120 may be embodied as, or otherwise include, any collection of devices capable of receiving rotational power from the drive unit 112 and transmitting rotational power to the wheels 104. In the illustrative embodiment, the transaxle 120 includes a transmission 130, a differential 140 (shown in phantom in FIG. 1) coupled to the transmission 130, and an axle assembly 150 (shown in phantom in FIG. 1) coupled to the differential 140.

It should be appreciated that the illustrative vehicle 100, and the powertrain 110 included therein, may be employed in a variety of applications. In some embodiments, the vehicle 100 may be embodied as, or otherwise include, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, the powertrain 110 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

Figure 2:
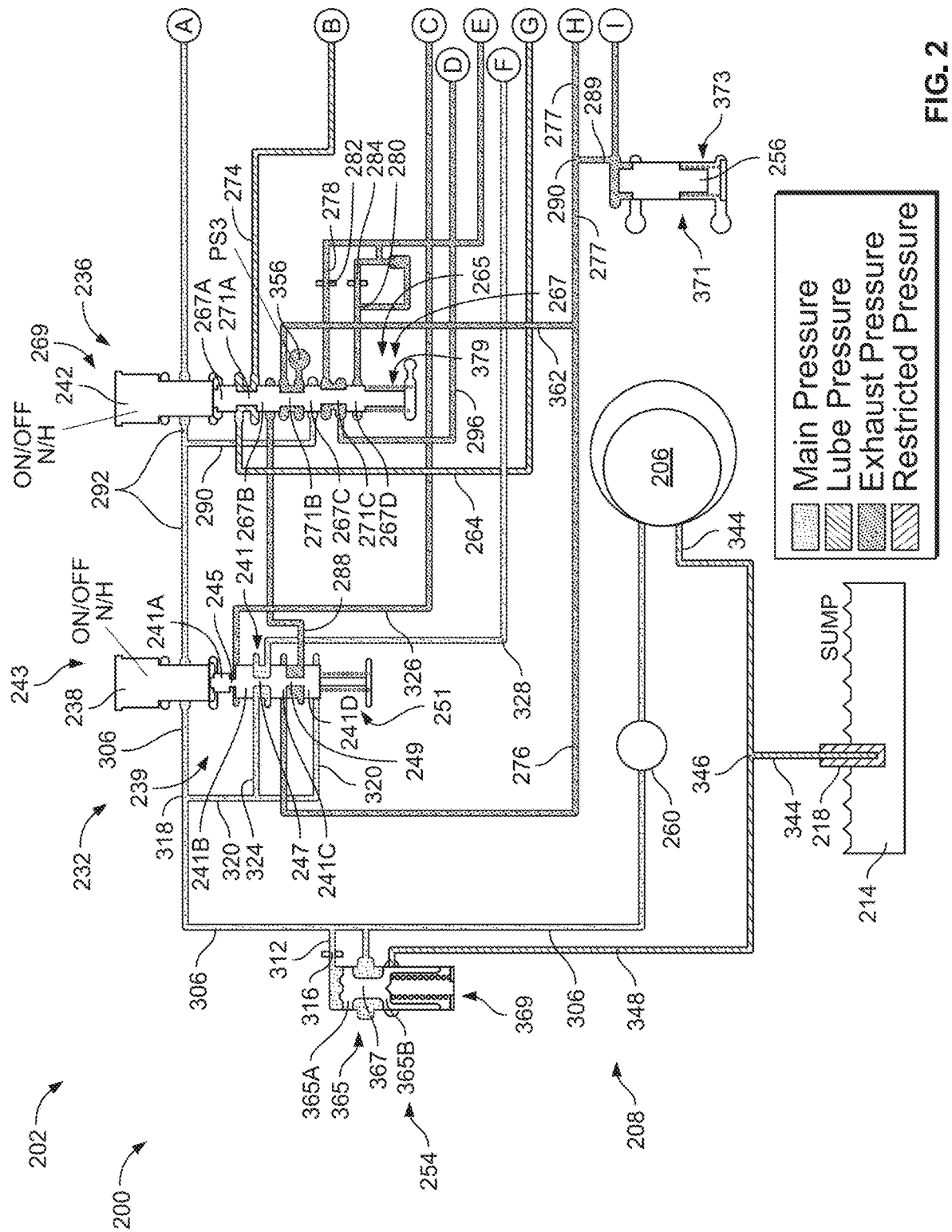
FIG. 2 is a schematic view of an electro-hydraulic circuit included in a transmission of the powertrain of FIG. 1 showing the electro-hydraulic circuit in one operational phase.
Figure 2:
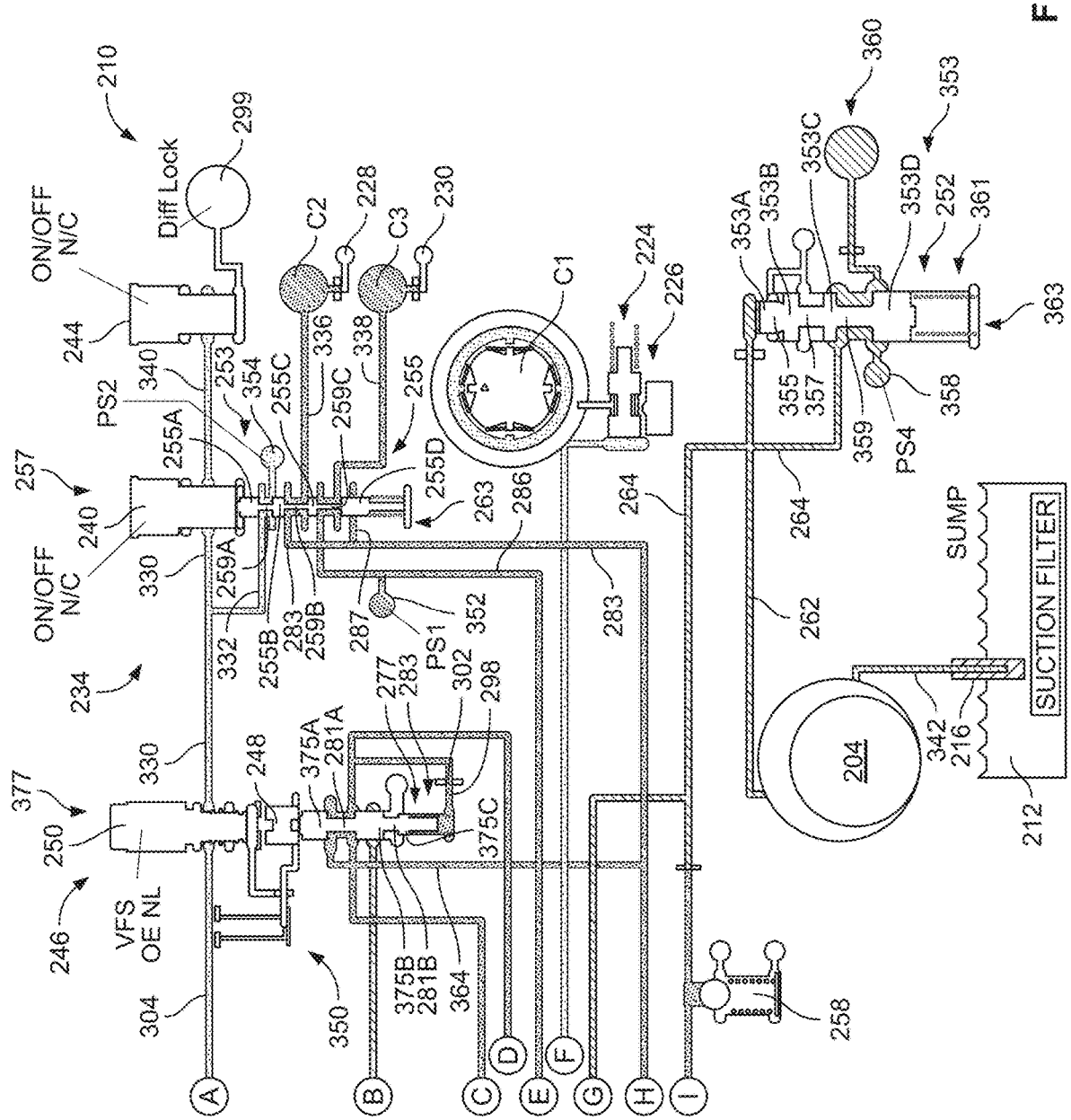

Referring now to FIG. 2, an electro-hydraulic circuit 200 adapted for use in the transmission 130 is illustrated in a preliminary operational phase 202. In some configurations, the preliminary phase 202 enables operation of the transmission 130 in a reverse operational range and/or a first forward operational range. The electro-hydraulic circuit 200 includes a pump 204 and a pump 206, and the pumps 204, 206 are fluidly coupled to torque-transmitting mechanisms C1, C2, C3 via a system or network of fluid lines or passages 208. The torque-transmitting mechanisms C1, C2, C3 are selectively engageable in response to one or more fluid pressures applied thereto. While the primary function of the pump 204 is to provide lube flow to the architecture, the pump 204 is also configured to selectively deliver fluid pressure to at least one of the torque-transmitting mechanisms C1, C2, C3 at a lube pressure or first pressure. The pump 206 is configured to selectively deliver fluid pressure to at least one of the torque-transmitting mechanisms C1, C2, C3 at a main pressure or second pressure greater than the lube pressure.

Figure 8:
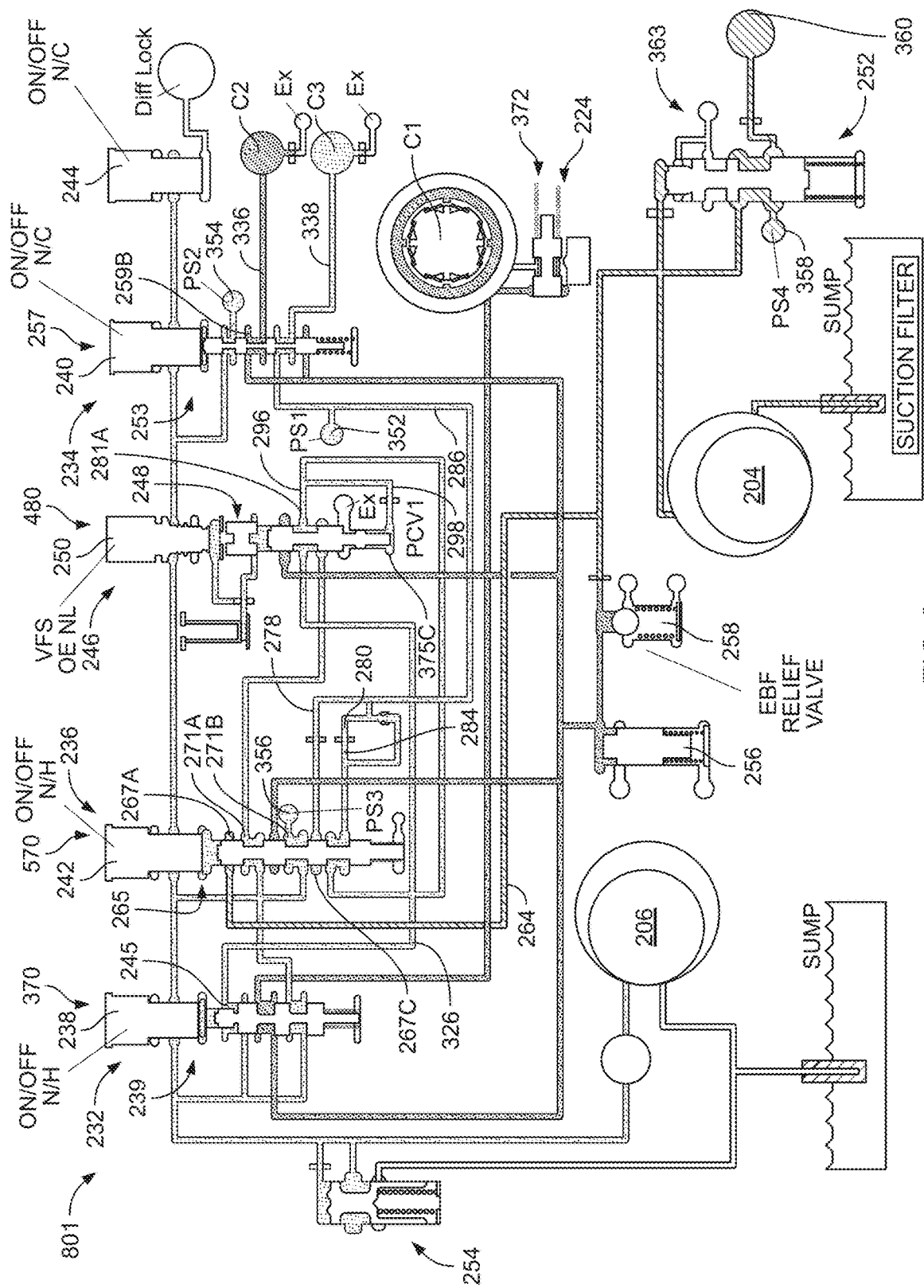
FIG. 8 is a schematic view similar to FIG. 2 showing the electro-hydraulic circuit in a third operational phase of the another multi-phase transition.
Figure 9:
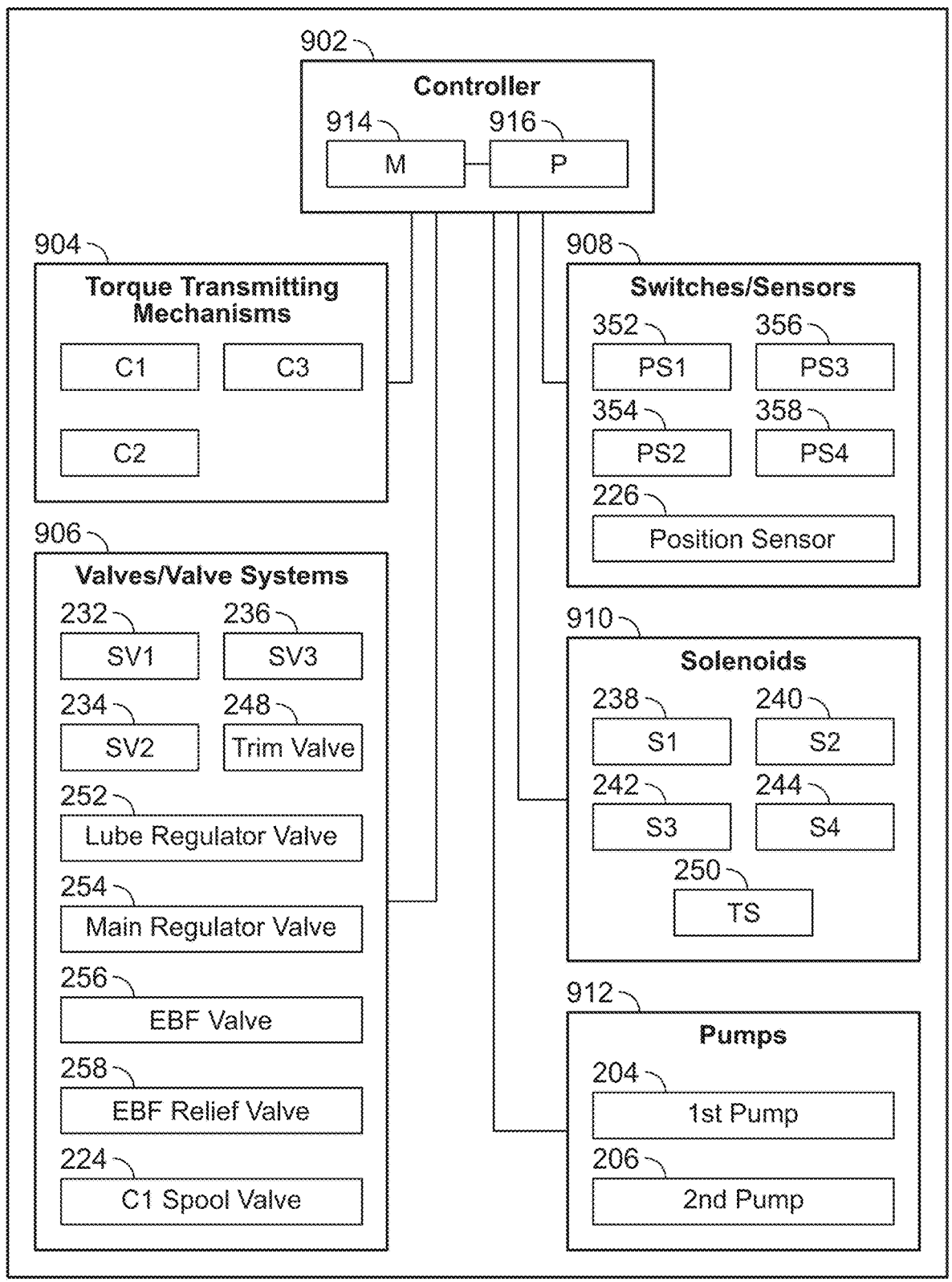
FIG. 9 is a block diagram view of an electro-hydraulic control system.

In the illustrative embodiment, the electro-hydraulic circuit 200 includes an electro-hydraulic control system 900 (see FIG. 9). The electro-hydraulic control system 900 is configured to control delivery of fluid pressure from the pumps 204, 206 to the torque-transmitting mechanisms C1, C2, C3 in various operational phases or modes of the transmission 130, as described in greater detail below. The electro-hydraulic control system 900 includes a controller 902 having a processor 916 and memory 914 having instructions stored therein. The instructions are executable by the processor 916 to cause the processor 916 to direct delivery of fluid pressure at the lube pressure from the pump 204 to at least one of the torque-transmitting mechanisms C1, C2, C3 during one operational phase (e.g., see FIG. 4 or FIG. 7) of a multi-phase transition or shift (e.g., the multi-phase shift shown in FIGS. 3-5 or the multi-phase shift shown in FIGS. 6-8) from one operating mode of the transmission 130 to another operating mode of the transmission 130. Additionally, the instructions are executable by the processor 916 to cause the processor 916 to direct delivery of fluid pressure at the main pressure from the pump 206 to at least one of the torque-transmitting mechanisms C1, C2, C3 during another operational phase (e.g., see FIG. 5 or FIG. 8) of the multi-phase transition from one operating mode of the transmission 130 to another operating mode of the transmission 130.

In the illustrative embodiment, the pumps 204, 206 are electric pumps. In some embodiments, the pumps 204, 206 are configured for use in electric vehicles, such as, for example, hybrid electric vehicles, plug-in hybrid electric vehicles, fuel cell electric vehicles, or any other type of electric vehicles. Additionally, in some embodiments, the vehicle 100 is an electric vehicle. However, in other embodiments, the pumps 204, 206 may be used in non-electric vehicles, such as vehicles incorporating internal combustion engines or any other type of non-electric vehicles. Further, in other embodiments, the pumps 204, 206 may be non-electric, mechanical pumps.

The lube pressure delivered by the pump 204 is illustratively less than the main pressure delivered by the pump 206, as mentioned above. Additionally, in the illustrative embodiment, the lube pressure is delivered by the pump 204 at a first flow rate and the main pressure is delivered by the pump 206 at a second flow rate that is less than the first flow rate. In some examples, the first flow rate may be in a range of from 15-25 liters per minute. Additionally, in some examples, the second flow rate may be in a range of from 1-10 liters per minute.

As shown in the illustrative example of FIG. 2, the pump 204 is fluidly coupled to a fluid source or sump 212 and the pump 206 is fluidly coupled to a fluid source or sump 214. The pump 204 is coupled to the first fluid source 212 via a fluid line 342. In some examples, the fluid sources 212, 214 are separate fluid sources. In other examples, the fluid sources 212, 214 form a portion of the same fluid source. In the illustrative embodiment, the fluid line 342 is at least partially positioned in a filter 216. In some embodiments, the filter 216 includes, or is embodied as, a suction filter at least partially immersed in the fluid source 212 such that fluid from the fluid source 212 is filtered by the filter 216 before being conducted through the fluid line 342.

In the illustrative example, the pump 206 is coupled to the fluid source 214 via a fluid line 344. In some embodiments, the fluid line 344 may be at least partially positioned in a filter 218 (shown in phantom). The filter 218 may be at least partially immersed in the fluid source 214 such that fluid from the fluid source 214 may be filtered by the filter 218 before being conducted through the fluid line 344. In some examples, the fluid line 344 includes a juncture 346 at which the fluid line 344 is connected to a fluid line 348. In some embodiments, the fluid line 348 may be a pump recirculation flow line configured to deliver excess oil from the main regulator overage to an inlet of the pump 206 to increase suction pressure.

The torque-transmitting mechanisms C1, C2, C3 are selectively fluidly coupled to at least one of pumps 204, 206 as discussed below. It should be appreciated that in some embodiments, the electro-hydraulic circuit 200 may include more than three torque-transmitting mechanisms C1, C2, C3. In any case, in the illustrative example of FIG. 2, the torque-transmitting mechanism C1 is a selectable one-way clutch that is operative to (e.g., in an engaged state) transmit, or disrupt transmission of, unidirectional mechanical power. Additionally, in some embodiments, the torque-transmitting mechanisms C1, C2, C3 are wet clutches. In some examples, the electro-hydraulic circuit 200 may include more than one one-way clutch. In some examples still, the electro-hydraulic circuit 200 may include more than three wet clutches.

In the illustrative embodiment, the torque-transmitting mechanism C1 is coupled to a position sensor 226. The position sensor 226 includes, or is otherwise embodied as, any device or collection of devices configured to detect a position of the torque-transmitting mechanism C1, such as a locked or engaged state and an unlocked or disengaged state, for example. In some embodiments, operation of the torque-transmitting mechanism C1 is driven by a spool valve 224 fluidly coupled to the torque-transmitting mechanism C1, and the position of the torque-transmitting mechanism C1 detected by the position sensor 226 may correspond to a positional state of a movable element (e.g., a spool) of the spool valve 224 and/or a fluid pressure applied to the spool valve 224. In some embodiments, the movable element is axially translatable in a valve body of the spool valve 224 between a stroked position and a de-stroked position, and movement of the movable element between the stroked and de-stroked positions may be detected by the position sensor 226.

The torque-transmitting mechanism C1 includes, or is coupled to, an exhaust port or fluid line (not shown). The torque-transmitting mechanism C2 includes, or is coupled to, an exhaust port or fluid line 228. The torque-transmitting mechanism C3 includes, or is coupled to, an exhaust port or fluid line 230. In some embodiments, exhaust fluid pressure (e.g., minimal or substantially zero fluid pressure that is less than the lube pressure and the main pressure) may be applied to the torque-transmitting mechanisms C1, C2, C3 through the corresponding exhaust ports when the torque-transmitting mechanisms C1, C2, C3 are operated in unlocked or disengaged states thereof. In some embodiments, exhaust fluid pressure may be substantially the same as exhaust backfill pressure (EBF).

In the illustrative embodiment, the torque-transmitting mechanism C2 is operable in discrete phases of a multiphase shift or transition from one operating mode of the transmission 130 to another operating mode thereof. The torque-transmitting mechanism C2 is operable in (i) one phase (shown in FIG. 3) in which exhaust fluid pressure is delivered to the torque-transmitting mechanism C2, (ii) another phase (shown in FIG. 4) in which lube pressure from the pump 204 is delivered to the torque-transmitting mechanism C2 to cause partial engagement thereof, and (iii) yet another phase (shown in FIG. 5) in which main pressure from the pump 206 is delivered to the torque-transmitting mechanism C2 to cause full or complete engagement thereof. In the illustrative embodiment, at least one shift or transition of the illustrative transmission 130 from one operating mode to another is characterized by successive delivery of exhaust, lube, and main pressures to the torque-transmitting mechanism C2, and delivery of main pressure to the torque-transmitting mechanism C2 defines, or is otherwise associated with, the final stage of the at least one shift or transition. Additionally, in the illustrative embodiment, the at least one shift or transition includes three discrete phases.

In the illustrative embodiment, the torque-transmitting mechanism C3 is operable in discrete phases of a multiphase shift or transition from one operating mode of the transmission 130 to another operating mode thereof. The torque-transmitting mechanism C3 is operable in (i) one phase (shown in FIG. 6) in which exhaust fluid pressure is delivered to the torque-transmitting mechanism C3, (ii) another phase (shown in FIG. 7) in which lube pressure from the pump 204 is delivered to the torque-transmitting mechanism C3 to cause partial engagement thereof, and (iii) yet another phase (shown in FIG. 8) in which main pressure from the pump 206 is delivered to the torque-transmitting mechanism C3 to cause full or complete engagement thereof. In the illustrative embodiment, at least one shift or transition of the illustrative transmission 130 from one operating mode to another is characterized by successive delivery of exhaust, lube, and main pressures to the torque-transmitting mechanism C3, and delivery of main pressure to the torque-transmitting mechanism C3 defines, or is otherwise associated with, the final stage of the at least one shift or transition. Additionally, in the illustrative embodiment, the at least one shift or transition includes three discrete phases.

Still referring to FIG. 2, the illustrative electro-hydraulic circuit 200 includes a plurality of shift valve assemblies 232, 234, 236, a trim system 246, and a solenoid 244, each of which is described in greater detail below. The shift valve assemblies 232, 234, 236, the trim system 246, and the solenoid 244 are fluidly coupled between the pumps 204, 206 and the torque-transmitting mechanisms C1, C2, C3 to, under control by the electro-hydraulic control system 900, selectively deliver various fluid pressures (e.g., one or more of the exhaust, lube, and main pressures) to the torque-transmitting mechanisms C1, C2, C3. It should be appreciated that fluidic interconnections between the pumps 204, 206 and the devices and/or assemblies 232, 234, 236, 244, 246, and between the devices and/or assemblies 232, 234, 236, 244, 246 and the torque-transmitting mechanisms C1, C2, C3, are established by a network of fluid lines or passages, many of which are described herein. For the purposes of the present disclosure, fluid lines or passages specifically described herein may form portions or segments of fluid couplings between interconnected components, and such portions or segments may be combined in order to define various fluid flow paths. Additionally, in some embodiments, fluid lines or passages specifically described herein may be defined by a valve body or fluid distribution manifold (not shown) in which the various components of the electro-hydraulic circuit are housed.

The illustrative shift valve assembly 232 includes a solenoid 238 and a shift valve 239 coupled to the solenoid 238. The solenoid 238 includes, or is otherwise embodied as, an on/off solenoid configured to receive control signals issued by the controller 902 and selectively drive axial translation of a movable spool 241 of the shift valve 239 based on the control signals between a de-stroked position 243 and a stroked position 341 (see FIG. 3). In some embodiments, the solenoid 238 is a normally-high solenoid operable in an energized state and a de-energized state based on the control signals issued by the controller 902, and de-energization of the solenoid 238 causes, or is otherwise associated with, translation of the spool 241 to the stroked position 341. The spool 241 includes lands 241A, 241B, 241C, 241D that are axially spaced from one another to define fluid chambers 245, 247, 249 therebetween. A return spring 251 of the shift valve 239 applies a biasing force to the spool 241 to urge the spool 241 toward the solenoid 238 in the axial direction.

The illustrative shift valve assembly 234 includes a solenoid 240 and a shift valve 253 coupled to the solenoid 240. The solenoid 240 includes, or is otherwise embodied as, an on/off solenoid configured to receive control signals issued by the controller 902 and selectively drive axial translation of a movable spool 255 of the shift valve 253 based on the control signals between a de-stroked position 257 and a stroked position 450 (see FIG. 4). In some embodiments, the solenoid 240 is a normally-closed solenoid operable in an energized state and a de-energized state based on the control signals issued by the controller 902. The spool 255 includes lands 255A, 255B, 255C, 255D that are axially spaced from one another to define fluid chambers 259A, 259B, 259C therebetween. A return spring 263 of the shift valve 253 applies a biasing force to the spool 255 to urge the spool 255 toward the solenoid 240 in the axial direction.

The illustrative shift valve assembly 236 includes a solenoid 242 and a shift valve 265 coupled to the solenoid 242. The solenoid 242 includes, or is otherwise embodied as, an on/off solenoid configured to receive control signals issued by the controller 902 and selectively drive axial translation of a movable spool 267 of the shift valve 265 based on the control signals between a de-stroked position 269 and a stroked position 570 (see FIG. 5). In some embodiments, the solenoid 242 is a normally-high solenoid operable in an energized state and a de-energized state based on the control signals issued by the controller 902, and de-energization of the solenoid 242 causes, or is otherwise associated with, translation of the spool 267 to the stroked position 570. The spool 267 includes lands 267A, 267B, 267C, 267D that are axially spaced from one another to define fluid chambers 271A, 271B, 271C therebetween. A return spring 379 of the shift valve 265 applies a biasing force to the spool 267 to urge the spool 267 toward the solenoid 242 in the axial direction.

In some embodiments, based on input provided by the electro-hydraulic control system 900, the illustrative trim system 246 is configured to control delivery of variable fluid pressures (i.e., the exhaust, lube, and main fluid pressures) to the torque-transmitting mechanisms C2, C3 during various operational modes of the transmission 130. In such embodiments, the trim system 246 may serve as, or otherwise provide, a primary electro-hydraulic mechanism for controlling operation of the torque-transmitting mechanisms C2, C3. In some examples, the electro-hydraulic circuit 200 may include only one trim system 246. In other examples, the electro-hydraulic circuit 200 may include more than one trim system 246.

In any case, the trim system 246 includes a solenoid 250 and a trim valve 248 coupled to the solenoid 250. The solenoid 250 includes, or is otherwise embodied as, a variable-frequency solenoid (VFS) configured to receive control signals issued by the controller 902 and selectively drive axial translation of a movable spool 375 of the trim valve 248 based on the control signals between a de-stroked position 377 and a stroked position 480 (see FIG. 4). In some embodiments, the solenoid 250 is a normally-low solenoid operable in an energized state and a de-energized state based on the control signals issued by the controller 902. The spool 375 includes lands 375A, 375B, 375C that are axially spaced from one another to define fluid chambers 281A and 281B therebetween. A return spring 283 of the trim valve 248 applies a biasing force to the spool 375 to urge the spool 375 toward the solenoid 250 in the axial direction.

In the illustrative embodiment, an accumulator 350 is fluidly coupled to the solenoid 250 and the trim valve 248. More specifically, the accumulator 350 is fluidly coupled between an output port of the solenoid 250 and the land 375A of the spool 375 of the trim valve 248. In some embodiments, the accumulator 350 is capable of controlling or adjusting shift feel during shifts or transitions from one operating mode of the transmission 130 to another operating mode. Additionally, in some embodiments, the accumulator 350 facilitates application of gradual fluid pressure (e.g., main fluid pressure delivered by the pump 206) to the trim valve 248 and/or the torque-transmitting mechanisms C2, C3 during one multi-phase transition from one operating mode of the transmission 130 to another operating mode. Further, in some embodiments, the accumulator 350 may be integrated into, or otherwise form a portion of, the trim system 246.

The illustrative solenoid 244 is fluidly coupled to a differential lock 299 of the electro-hydraulic circuit 200. In some embodiments, the differential lock 299 is a hydraulically-actuated mechanism (e.g., a brake) configured to lock the differential 140 to resist rotation thereof in use of the vehicle 100. Regardless, the solenoid 244 includes, or is otherwise embodied as, an on/off solenoid configured to receive control signals issued by the controller 902 and selectively actuate the differential lock 299 based on the control signals. In some embodiments, the solenoid 244 is a normally-closed solenoid operable in an energized state and a de-energized state based on the control signals issued by the controller 902.

In the illustrative embodiment, the electro-hydraulic circuit 200 includes a lube regulator valve 252 and the main regulator valve 254. The regulator valve 252 is fluidly coupled (i) between the pump 204 and the shift valve assemblies 232, 234, 236 and (ii) between the pump 204 and the trim system 246. The regulator valve 254 is fluidly coupled (i) between the pump 206 and the shift valve assemblies 232, 234, 236 and (ii) between the pump 206 and the trim system 246. The illustrative lube regulator valve 252 is configured to receive lube pressure delivered by the pump 204 and route lube pressure to one or more of the shift valve assemblies 232, 234, 236, the trim system 246, and a lube cross-section 360. The illustrative main regulator valve 254 is configured to receive main pressure delivered by the pump 206 and route main pressure to one or more of the shift valve assemblies 232, 234, 236, the trim system 246, and the solenoid 244.

In the illustrative embodiment, the regulator valve 252 includes a spool 353 having lands 353A, 353B, 353C, 353D that are axially spaced from one another to define fluid chambers 355, 357, 359 therebetween. A return spring 361 of the regulator valve 252 applies a biasing force to the spool 353 to urge the spool 353 in an axial direction away from the return spring 361. In some embodiments, the spool 353 is movable between a stroked position 363 and a de-stroked position 465 (see FIG. 4). The fluid chamber 359 is fluidly coupled to the lube cross-section 360 to deliver lube pressure from the pump 204 thereto when the spool 353 is in the stroked position 363, and the land 353D blocks delivery of lube pressure from the pump 204 to the lube cross-section 360 when the spool 353 is in the de-stroked position 465. In the illustrative embodiment, a pressure sensor 358 is fluidly coupled to the fluid chamber 359 and configured to detect fluid pressure (or lack thereof) delivered to the fluid chamber 359 and the lube cross-section 360.

In some embodiments, the lube cross-section 360 includes, or is otherwise coupled to, one or more hydraulic or electro-hydraulic devices of the transmission 130 separate from the aforementioned components of the electro-hydraulic circuit 200. In the illustrative embodiment, when lube pressure is delivered by the pump 204 to one of the torque-transmitting mechanisms C2, C3, lube pressure is not delivered by the pump 204 to the lube cross-section 360 through the regulator valve 252. Conversely, when lube pressure is not delivered by the pump 204 to one of the torque-transmitting mechanisms C2, C3, lube pressure is delivered by the pump 204 to the lube cross-section 360 through the regulator valve 252. It should be appreciated that a lack of delivery of lube pressure to the lube cross-section 360 preserves additional fluid for delivery to one of the torque-transmitting mechanisms C2, C3 during multi-phase shifts to reduce clutch fill times, at least in some embodiments.

The illustrative regulator valve 254 includes a movable valve element 365 having lands or extensions 365A, 365B that are axially spaced from one another to define a fluid chamber 367 therebetween. The regulator valve 254 includes a return spring 369 that applies a biasing force to the valve element 365 to urge the valve element 365 in an axial direction away from the return spring 369. The regulator valve 254 is fluidly coupled to the fluid source 214 through the fluid lines 344, 348. In the illustrative embodiment, main pressure delivered by the pump 206 is routed to the regulator valve 254 and to each of the shift valve assemblies 232, 234, 236, the trim system 246, and the solenoid 244 through the regulator valve 254 during each of the operational modes of the transmission 130 described below. Additionally, in some embodiments, a high pressure filter 260 is fluidly coupled between the pump 206 and the regulator valve 254 to route main pressure fluid filtered by the filter 260 to downstream devices of the electro-hydraulic circuit 200, such as the shift valve assemblies 232, 234, 236, the trim system 246, and the solenoid 244, for example.

Still referring to FIG. 2, the illustrative electro-hydraulic circuit 200 includes an exhaust backfill (EBF) valve 256 and an EBF relief valve 258. The EBF valve 256 may be fluidly coupled to the shift valve assemblies 232, 234, 236 and the trim system 246. The function of these valves 256, 258 may be to regulate or control pressure to different portions of the electro-hydraulic circuit 200. The illustrative EBF valve 256 is configured to route exhaust pressure to one or more of the shift valve assemblies 232, 234, 236, and the trim system 246.

In the illustrative embodiment, the EBF valve 256 includes a moveable valve element 371 and a return spring 373 that applies a biasing force to the valve element 371 to urge the valve element 371 in an axial direction away from the return spring 373. In the illustrative embodiment, exhaust pressure is routed to each of the shift valve assemblies 232, 234, 236, and the trim system 246 through the EBF valve 256. Additionally, in some embodiments, the EBF valve 256 is fluidly coupled between the EBF relief valve 258 and the shift valve assemblies 232, 234, 236 and trim system 246 to regulate the pressure or to protect the system from an over-pressure condition. While these valves 256, 258 are shown in FIG. 2, it is to be understood that this is only one of many possible examples of the electro-hydraulic circuit 200. One or more of these valves 256, 258 may be disposed in a valve body or other support structure of the transmission 130.

It should be understood that the system of fluid lines 208, illustrated in FIG. 2 and described herein, is just one of many possible examples. Also, while individual fluid lines are mentioned herein, for example, fluid line 262, it should be understood that these individual fluid lines may include a plurality of fluid lines coupled together to form each individual fluid line.

The illustrative EBF valve 256 may route exhaust pressure to the shift valve 239. When the shift valve 239 is in the de-stroked position 243, the EBF valve 256 may be coupled to the fluid chamber 249 via the fluid lines 276, 277, 289. The illustrative EBF valve 256 may also route exhaust pressure to the shift valve 253. When the shift valve 253 is in the de-stroked position 257, as in FIG. 2, the EBF valve 256 may route exhaust pressure to the fluid chamber 259B and the land 255D via the fluid lines 277, 283, 287, 289.

The illustrative EBF valve 256 may also route exhaust pressure to the shift valve 265. When the shift valve 265 is in the de-stroked position 269, as in FIG. 2, the EBF valve 256 may route exhaust pressure to the fluid chamber 271B via the fluid lines 277, 289, 362. The illustrative EBF valve 256 may also route exhaust pressure to the trim valve 248. When the trim valve 248 is in the de-stroked position 377, as illustrated in FIG. 2, the EBF valve 256 may route exhaust pressure to the fluid chamber 281A via the fluid lines 277, 289, 364.

The pump 204 is configured to route lube pressure to one or more of the shift valve assemblies 232, 234, 236, the trim system 246, and the lube cross-section 360. In the illustrative example, the pump 204 may route lube pressure to the lube regulator valve 252 and/or to the shift valve 265. More specifically, the pump 204 may route lube pressure to the land 353A, and the fluid chamber 359 of the regulator valve 252 via the fluid lines 262, 264, and the lube regulator valve 252 may route lube pressure to the lube cross-section 360. Additionally, when the shift valve 265 is in the de-stroked position 269, as in FIG. 2, the pump 204 may route lube pressure to the fluid chamber 271A of the shift valve 265 via fluid lines 262, 264.

In the illustrative embodiment, main pressure delivered by the pump 206 may be routed to the regulator valve 254 and to each of the shift valve assemblies 232, 234, 236, the trim system 246, and the solenoid 244. Main pressure may be delivered from the pump 206 to the regulator valve 254 and further to the shift valve 239 and the solenoid 238. Main pressure may be routed from the pump 206 to the regulator valve 254 via the fluid lines 306, 208. When the shift valve 239 is in the de-stroked position 243, as in FIG. 2, main pressure from the regulator valve 254 may be routed to the fluid chamber 247 and the land 241D via the fluid lines 306, 312, 320, 324.

Main pressure may also be routed from the main regulator valve 254 to the solenoid 238 via the fluid lines 306, 312. In some examples, main pressure may bypass the main regulator valve 254 and may be routed from the pump 206 to one or more of the shift valve 239 and the solenoid 238 via the fluid lines 306, 320, 324. In some examples, a shut-off valve 316 may be positioned downstream of the main regulator valve 254 and the shut-off valve 316 may be turned to an off position thereby blocking fluid from being routed through the fluid line 312. In these examples, when the shut-off valve 316 is in the off position, fluid may bypass the main regulator valve 254. Main pressure may also be routed from the main regulator valve 254 to the solenoids 240, 242, 244, 250 via the fluid lines 292, 304, 306, 312, 330, 340.

In the illustrative embodiment, main pressure may be routed between the shift valve 239 and the torque-transmitting mechanism C1. As illustrated in FIG. 2, when the shift valve 239 is in the de-stroked position 243 main pressure may be routed between the fluid chamber 247 and the torque-transmitting mechanism C1 via the fluid line 328. When the shift valve 239 is in this de-stroked position 243, exhaust pressure may be routed between the shift valve 239 and the shift valve 265. More specifically, exhaust pressure may be routed between the fluid chamber 249 and the land 267B when both of the shift valves 239, 265 are in the de-stroked position 243, 269. Exhaust pressure may also be routed between the shift valve 239 and the trim valve 248 when the trim valve 248 is in the de-stroked position 377. The fluid line 326 may route exhaust pressure between the fluid chambers 281A, 245 when both the shift valve 239 and the trim valve 248 are in the de-stroked position 243, 377.

The illustrative shift valve 265 may be fluidly coupled to the solenoid 238, and main pressure may be routed between the shift valve 265 and the solenoid 238. For example, as illustrated in FIG. 2, when the shift valve 265 is in the de-stroked position 269, the fluid lines 290, 292 may route main pressure between the solenoid 238 and the land 267C. The shift valve 265 may also be fluidly coupled to the trim valve 248. When the shift valve 265 is in the de-stroked position 269, lube pressure may be routed between the fluid chambers 271A, 375B via the fluid line 274. Additionally, when the trim valve 248 is in the de-stroked position 377, exhaust may be routed between the shift valve 265 and the trim valve 248 via the fluid line 296, the fluid line 296 being coupled between the fluid chambers 271C, 281A. Further, when the trim valve 248 is in the de-stroked position 377, exhaust may be routed between the fluid chamber 281A and the return spring chamber of the trim valve 248 via the fluid line 298. In some examples an orifice 302 may be positioned in the fluid line 298.

The shift valve 265 may also be fluidly coupled to the shift valve 253. As shown in the illustrative example of FIG. 2, when the trim valve 248 is in the de-stroked position 377 exhaust pressure may be routed between the shift valves 253, 265. In some examples, when the shift valve 265 is in the de-stroked position 269, as in FIG. 2, exhaust pressure may be routed between the fluid chamber 271C and the fluid chamber 259C via the fluid lines 278, 286. When the shift valve 265 is in the de-stroked position 269, exhaust pressure may also be routed between the land 267D and the fluid chamber 259C via the fluid lines 280, 286. In some examples, as illustrated in FIG. 2, two fluid lines 278, 280 may converge into a single fluid line 286. The fluid line 278 may include an orifice 282 and the fluid line 280 may also include an orifice 284. The internal diameter or dimension of the orifice 282 may be larger relative to the orifice 284. In some examples, the larger orifice 282 may be sized to efficiently route lube pressure and the smaller orifice 284 may be sized to efficiently route main pressure.

In the illustrative embodiment of FIG. 2, main pressure may be routed to the shift valve 253. In some examples, when the shift valve 253 is in the de-stroked position 257, main pressure may be routed between the solenoid 250 and the fluid channel 259A via the fluid lines 330, 332. In the illustrative embodiment, when the shift valve 253 is in the de-stroked position 257, a pressure sensor 354 is fluidly coupled to the fluid chamber 259A and the pressure sensor 354 is configured to detect fluid pressure (or lack thereof) delivered to the fluid chamber 259A. When the shift valve 253 is in the de-stroked position 257, exhaust may be routed between the shift valve 253 and the torque-transmitting mechanisms C2, C3. As illustrated in FIG. 2, exhaust may be routed between the fluid chamber 259B and the torque-transmitting mechanism C2 via the fluid line 336. Exhaust may also be routed between the fluid chamber 259C and the torque-transmitting mechanism C3 via the fluid line 338.

The electro-hydraulic circuit 200 may transition between one or more phases. When the electro-hydraulic circuit 200 is in phase 202, which may be referred to as a preliminary phase, the electro-hydraulic circuit components may be in a preliminary configuration. The electro-hydraulic circuit components, hereinafter referred to as "the components," may comprise the shift valve assemblies 232, 234, 236, the trim system 246, and the solenoid 244. The different configurations may refer to whether one or more valves 239, 248, 252, 253, 265 are in a stroked or de-stoked position and whether one or more solenoids 238, 240, 242, 244, 250 are in an on or off position. When the electro-hydraulic circuit 200 is in phase 301 (see FIG. 3), which may be referred to as a first phase, the components may be in a first configuration. In the first configuration, one or more of the components may be in a different configuration relative to the preliminary configuration.

As illustrated in FIG. 2, the electro-hydraulic circuit 200 may be in phase 202. In some examples, the phase 202 may also be referred to as a reverse phase or a first phase. In the phase 202, the components may be in the preliminary configuration, wherein the shift valves assemblies 232, 234, 236, and the trim system 246 may be de-stroked and the solenoids 238, 242 may be on, or energized, and the solenoids 240, 244, 250 may be off, or de-energized.

Figure 3:
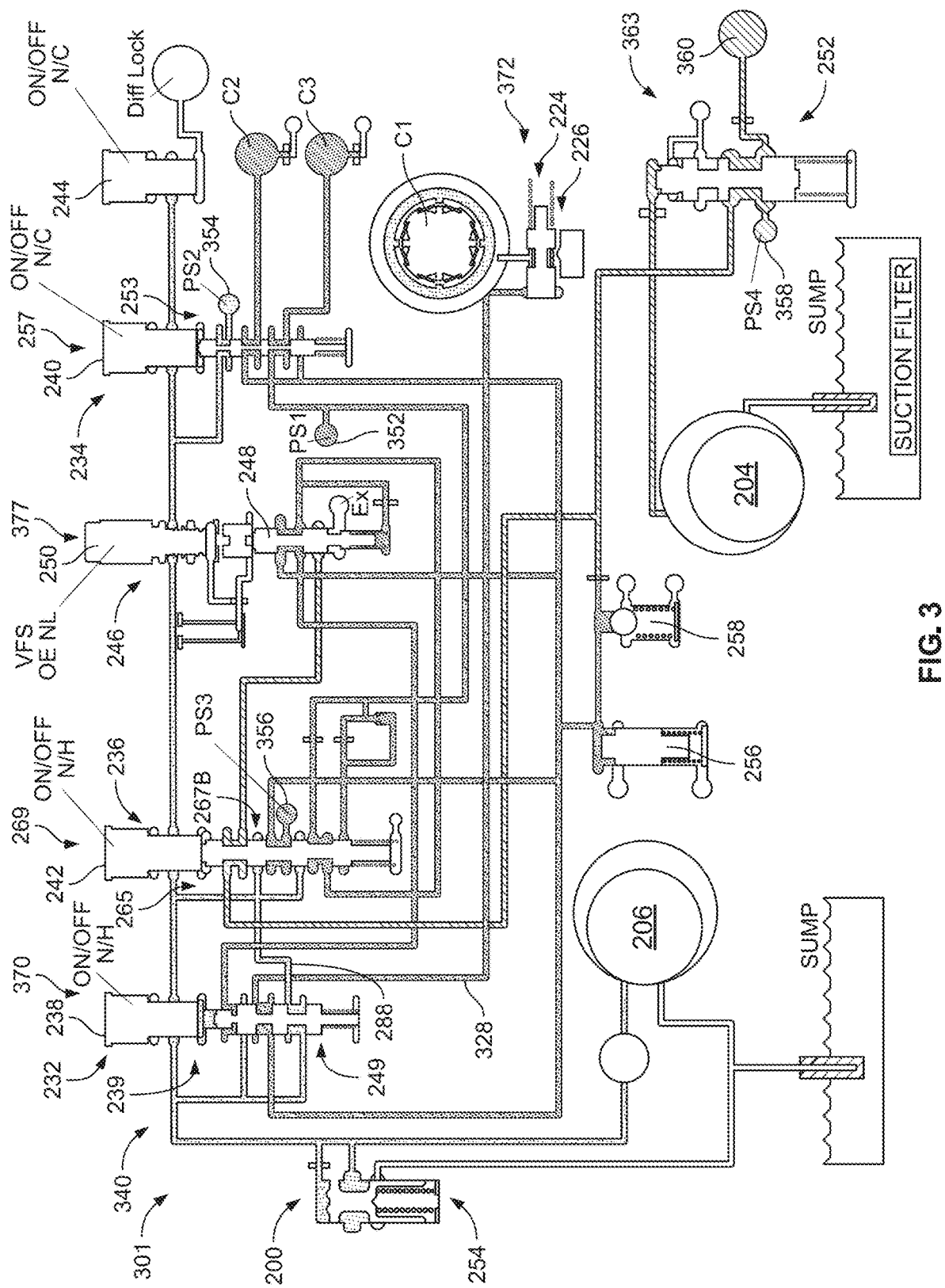
FIG. 3 is a schematic view similar to FIG. 2 showing the electro-hydraulic circuit in a first operational phase of one multi-phase transition.

Referring now to FIG. 3, the electro-hydraulic circuit 200 is illustrated in phase 301, which may also be referred to as a first phase or a pre-shift phase. In the phase 301, the solenoid 242 may be energized, and the solenoids 238, 240, 244, 250 may be de-energized. In some examples, when the solenoid 238 is de-energized, the shift valve 239 may be in the stroked position 370, when the solenoid 240 is de-energized, the shift valve 253 may be in the de-stroked position 257, when the solenoid 242 is energized, the shift valve 265 may be in the de-stroked position 269, and when the trim solenoid 250 is de-energized, the trim valve 248 may be in the de-stroked position 377.

According to some examples, as in FIG. 3, when the shift valve 239 is in the stroked position 370, exhaust pressure may be delivered to the torque-transmitting mechanism C1, and the torque-transmitting mechanism C1 may be disengaged. In the illustrative example of FIG. 3, exhaust pressure may be delivered to the torque-transmitting mechanisms C2, C3 and the torque-transmitting mechanisms C2, C3 may be disengaged. In some examples, as in FIG. 3, exhaust pressure may be delivered to pressure sensor 352, main pressure may be delivered to the pressure sensor 354, exhaust pressure may be delivered to the pressure sensor 356, and lube pressure may be delivered to the pressure sensor 358.

In the illustrative embodiment of FIG. 3, when the shift valve 239 is in the stroked position 370, exhaust pressure may be routed between the shift valve 239 and the first torque-transmitting mechanism C1 and/or the spool valve 224. Specifically, as illustrated in FIG. 3, fluid channel 247 of the shift valve 239 may be fluidly coupled to the torque-transmitting mechanism C1 and to the spool valve 224 via fluid line 328. When exhaust pressure is routed to the first-torque transmitting mechanism C1, the first torque-transmitting mechanism C1 may be in the unlocked or disengaged state. In some embodiments, operation of the torque-transmitting mechanism C1 is driven by the spool valve 224 fluidly coupled to the torque-transmitting mechanism C1, and the position of the torque-transmitting mechanism C1 may correspond to the spool valve 224 and/or a fluid pressure applied to the spool valve 224. As illustrated in the example of FIG. 3, when exhaust fluid pressure is applied to the spool valve 224, the spool valve 224 may be in the de-stroked position 372 and the first torque-transmitting mechanism C1 may be unlocked or disengaged.

In some examples, when the shift valve 239 is in the stroked position 370, main pressure may be routed between the shift valve 239 and the shift valve 265. In the illustrative example of FIG. 3, when the shift valve 239 is in the stroked position 370 and the shift valve 265 is in the de-stroked position 269, main pressure may be routed between fluid chamber 249 and land 267B via fluid line 288. According to some examples, in phase 301 lube pressure may be delivered to the lube cross-section 360.

Figure 4:
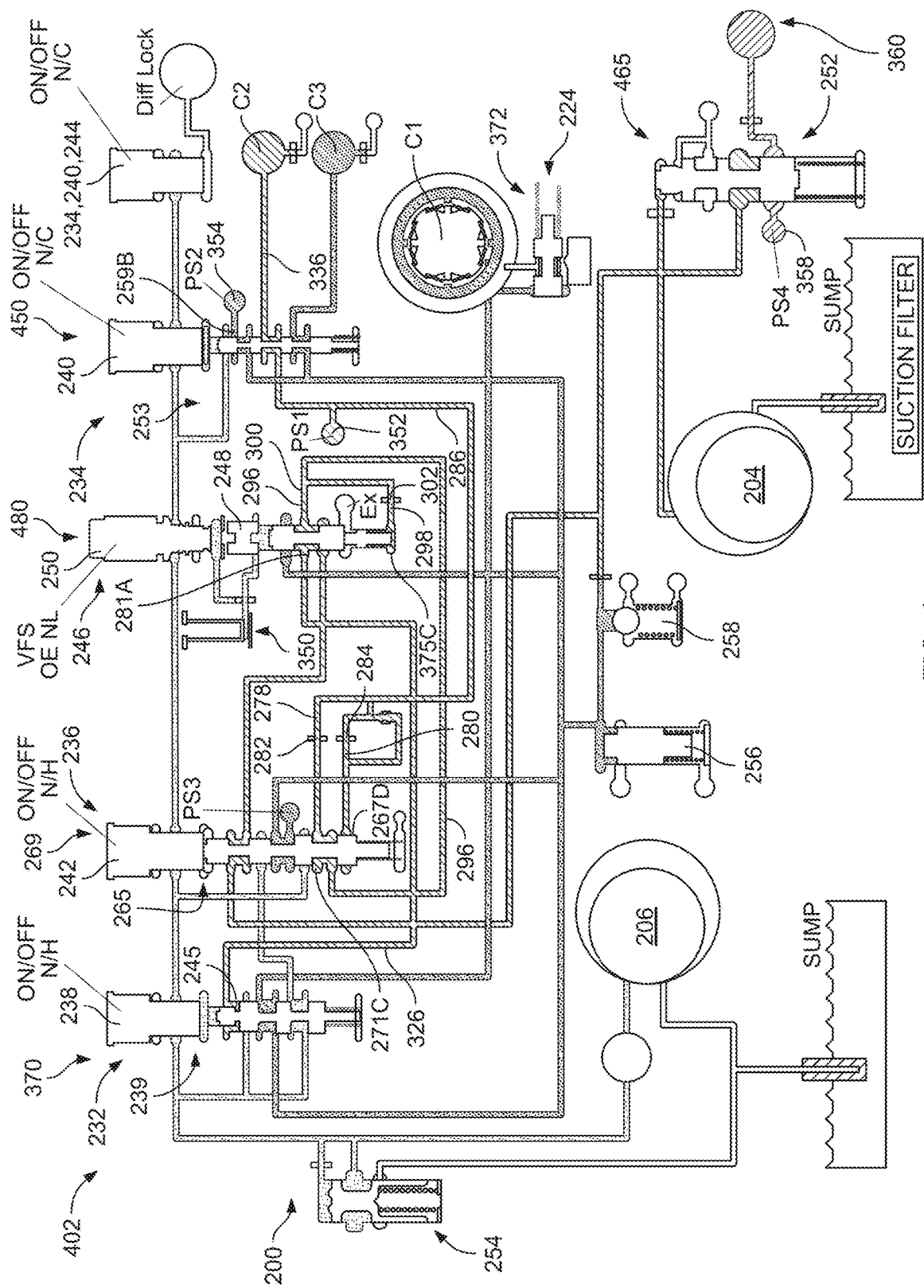
FIG. 4 is a schematic view similar to FIG. 2 showing the electro-hydraulic circuit in a second operational phase of the one multi-phase transition.

Referring now to FIG. 4, the electro-hydraulic circuit 200 is illustrated in phase 402, which may be referred to as a fill phase or a second phase. The phase 402 is an example of one operational phase of the multi-phase transition or shift, wherein exhaust pressure is delivered to the torque-transmitting mechanisms C1, C3, and the torque-transmitting mechanisms C1, C3 are disengaged. When the torque-transmitting mechanism C1 is disengaged, or unlocked, as in FIG. 4, the spool valve 224 may be in the de-stroked position 372. Also, as illustrated in FIG. 4, lube pressure may be routed to the torque-transmitting mechanism C2 and the torque-transmitting mechanism C2 may be partially engaged.

In some examples, as in FIG. 4, the solenoids 238, 244 may be de-energized and the solenoids 240, 242, 250 may be energized. According to some embodiments, when the solenoid 238 is de-energized, the shift valve 239 may be in the stroked position 370, when the solenoid 240 is energized, the shift valve 253 may be in the stroked position 450, when the solenoid 242 is in the de-stroked position, the shift valve 265 may be in the de-stroked position 269, and when the trim solenoid 250 is energized, the trim valve 248 may be in the stroked position 480.

According to some examples, lube pressure may be delivered to the pressure sensor 352, exhaust pressure may be delivered to the pressure sensor 354, exhaust pressure may be delivered to the pressure sensor 356, and exhaust pressure may be delivered to the pressure sensor 358. In the illustrative example of FIG. 4, lube pressure may not be routed to, or may be otherwise cut-off from, the lube cross-section 360 and the pressure sensor 358. Additionally, as illustrated in FIG. 4, lube regulator valve 252 may be in the de-stroked position 465.

When the trim valve 248 is in the stroked position 480, the trim valve 248 may be fluidly coupled to the shift valve 265. In some examples, as in FIG. 4, lube pressure may be routed between fluid chamber 281A and fluid chamber 271C via the fluid line 296. When the trim valve 248 is in the stroked position 480 and the shift valve 265 is in the de-stroked position 269, lube pressure may be routed from one portion of the trim valve 248 to another portion of the trim valve 248. For example, as in FIG. 4, the fluid channel 281A may route lube pressure to the fluid channel 375C via the fluid lines 296, 298. Further, when the trim valve 248 is in the stroked position 480, as in FIG. 4, main pressure may be routed to the accumulator 350. More specifically, main pressure may be routed between the output port of the solenoid 250, the accumulator 350, and the land 375A of the trim valve 248.

As illustrated in FIG. 4, when the trim valve 248 is in the stroked position 480 and the shift valve 265 is the de-stroked position 269, lube pressure may be routed between the trim valve 248 and the shift valve 239. In some examples, the fluid chamber 281A may be fluidly coupled to the fluid chamber 245 via the fluid line 326. Additionally, when the trim valve 248 is in the stroked position 480 and the shift valve 265 is in the de-stroked position 269, the shift valve 265 may route lube pressure to the shift valve 253. In some examples, as in FIG. 4, lube pressure may be routed between the fluid chamber 271C and the fluid chamber 259B by the fluid lines 278, 286, and fluid may be routed through the orifice 282. In some examples, when the trim valve 248 is in the stroked position 480 and the shift valve 265 is in the de-stroked position 269, lube pressure may be routed to the pressure sensor 352. In some examples, when the shift valve 265 is in the de-stroked position 269, lube pressure may be routed between the fluid chambers 271C and 267D of shift valve 265 via the fluid lines 278, 280.

As illustrated in FIG. 4, when the shift valves 239, 253 and the trim valve 248 are in the stroked position 370, 450, 480, and the shift valve 265 is in the de-stroked position 269, lube pressure may be delivered to the second torque-transmitting mechanism C2. In some examples, the fluid chamber 259B may route lube pressure to the second torque-transmitting mechanism C2 via the fluid line 336. When lube pressure is routed to the second torque-transmitting mechanism C2, the second torque-transmitting mechanism C2 may be in a partially engaged state.

Still referring to FIG. 4, the lube regulator valve 252 may be in the de-stroked position 465. In the de-stroked position 465, lube pressure may not be routed to, or may be otherwise cut-off from, the lube cross-section 360 and the pressure sensor 358. In some examples, not routing, or cutting-off, lube pressure to the lube cross-section 360 may result in a transmission 130 that routes lube pressure throughout the electro-hydraulic system 200 faster relative to a similar transmission that routes lube pressure to the lube cross-section 360 during phase 402. Cutting-off lube pressure to the lube cross-section 360 may result in a faster fill phase or a faster completion of phase 402 relative to transmissions that route lube pressure to the lube cross-section 360. In some examples, the pressure sensors 352, 358 may indicate the end of the phase 402.

Figure 5:
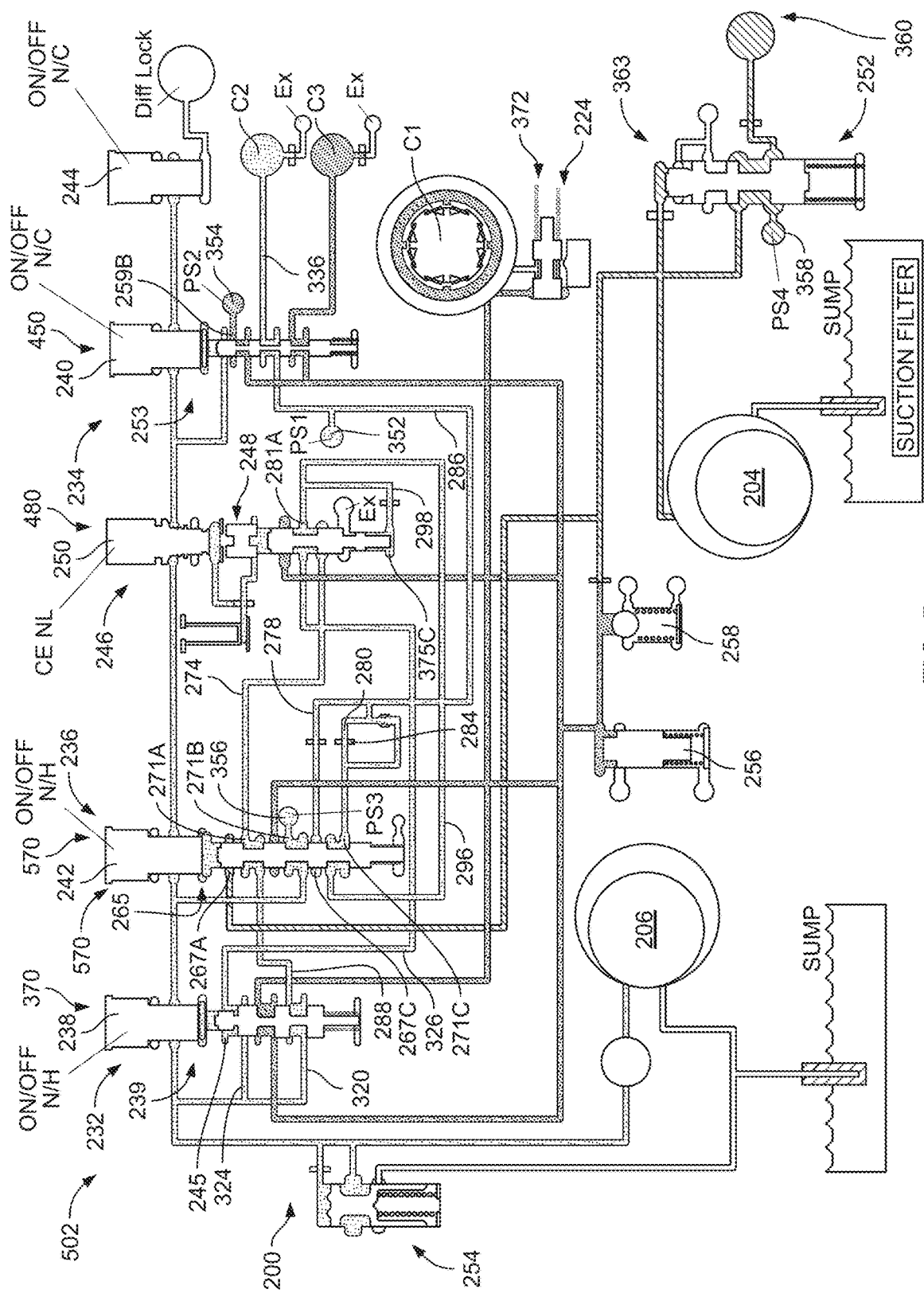
FIG. 5 is a schematic view similar to FIG. 2 showing the electro-hydraulic circuit in a third operational phase of the one multi-phase transition.

Referring now to FIG. 5, the electro-hydraulic circuit 200 is illustrated in phase 502, which may be referred to as a shift complete phase or a third phase. The phase 502 is an operational phase of the multi-phase transition or shift, wherein main pressure is routed to the torque-transmitting mechanism C2 thereby engaging the torque-transmitting mechanism C2. Also, as illustrated in FIG. 5, exhaust pressure may be delivered to the torque-transmitting mechanisms C1, C3 and the torque-transmitting mechanisms C1, C3 may be disengaged. In some embodiments, the spool valve 224 may be in the de-stroked position 372 and the torque-transmitting mechanism C1 may be unlocked. According to some examples, the solenoids 240, 250 may be energized and the solenoids 238, 242, 244 may be de-energized. Also, as in FIG. 3, the shift valves 239, 253, 265, trim valve 248, and the lube regulator valve 252 may be in the stroked position 370, 450, 570, 480, 363.

In the illustrative example of FIG. 5, main pressure may be delivered to pressure sensors 352, 356. In some examples, exhaust pressure may be delivered to the pressure sensor 354. According to some examples the lube regulator valve 252 may be in the stroked position 363, and lube pressure may be routed to the lube cross-section 360 and to the pressure sensor 358. Also, when the shift valve 265 is in the stroked position 570, as in FIG. 5, lube pressure may be routed between the pump 204 and the land 267A of the shift valve 265 via the fluid lines 262, 264.

When the shift valve 265 is in the stroked position 570, as in FIG. 5, main pressure may be routed between the shift valve 265 and trim the valve 248. Specifically, the fluid chamber 271A may be fluidly coupled to the fluid chamber 281A via the fluid line 274. In some examples, the shift valve 265 may be fluidly coupled to the shift valve 253. More specifically, main pressure may be routed between the fluid chambers 271C, 259B via the fluid lines 280, 286, and main pressure may be routed through the orifice 284. In some embodiments, main pressure may be routed to the pressure sensor 352 when main pressure is routed between the shift valves 265, 253. The shift valve 253 may be fluidly coupled to the second torque-transmitting mechanism C2, and the fluid channel 259B may route high pressure to the torque-transmitting mechanism C2 via fluid line 336.

As illustrated in FIG. 5, main pressure may be routed from the fluid chamber 271C to the land 267C of the shift valve 265 via the fluid lines 280, 278. In the illustrative embodiment of FIG. 5, when the shift valve 265 is in the stroked position 570, main pressure may be routed between the solenoid 238 and the fluid channel 271B of the shift valve 265 and the pressure sensor 356. When the shift valve 265 is in the stroked position 570, as in FIG. 5, main pressure may be routed between the shift valve 265 and the trim valve 248 via the fluid line 296, the fluid line 296 fluidly coupling the fluid chambers 271C, 281A. In the illustrative example of FIG. 5, main pressure may be routed between the trim valve 248 and the shift valve 239. In some examples, the fluid chamber 281A may be fluidly coupled to the fluid chamber 245 via the fluid line 326. In some examples, as in FIG. 5, main pressure may also be routed between the fluid chambers 281A, 375C of the trim valve 248.

Figure 6:
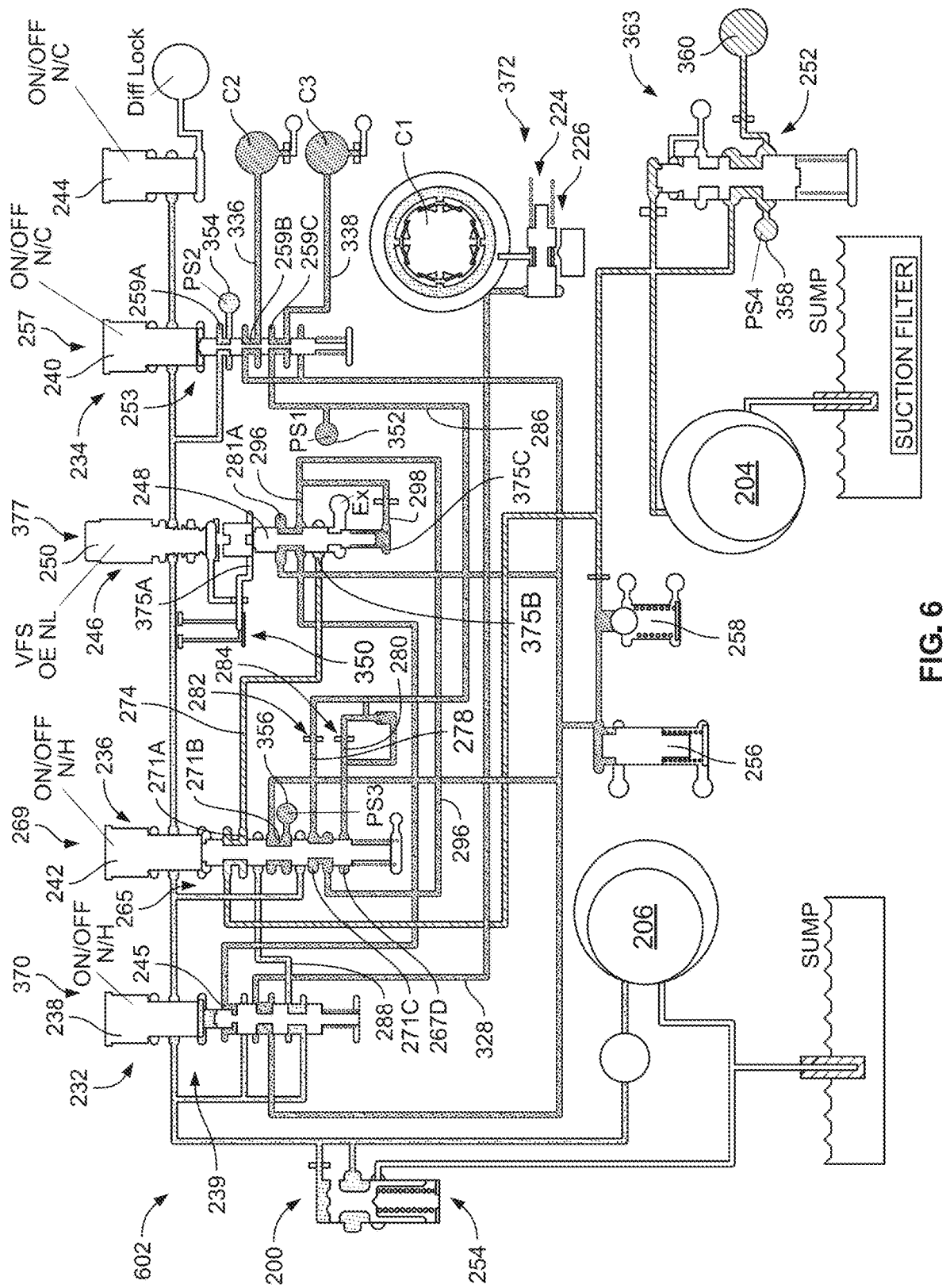
FIG. 6 is a schematic view similar to FIG. 2 showing the electro-hydraulic circuit in a first operational phase of another multi-phase transition.

Referring now to FIG. 6, the electro-hydraulic circuit 200 is illustrated in phase 602, which may also be referred to as a fourth phase or a pre-shift phase. In some examples, the electro-hydraulic circuit of FIG. 6 may have a similar, or the same, configuration as the electro-hydraulic circuit 200 of FIG. 3. As illustrated in FIG. 6, the solenoid 242 may be energized, and the solenoids 238, 240, 244, 250 may be de-energized. In some examples, when the solenoid 238 is de-energized, the shift valve 239 may be in the stroked position 370, when the solenoid 240 is de-energized, the shift valve 253 may be in the de-stroked position 257, when the solenoid 242 is energized, the shift valve 265 may be in the de-stroked position 269, and when the trim solenoid 250 is de-energized, the trim valve 248 may be in the de-stroked position 377.

According to some examples, as in FIG. 6, exhaust pressure may be delivered to the torque-transmitting mechanism C1 and the torque-transmitting mechanism C1 may be disengaged. According to some examples, when the torque-transmitting mechanism C1 is disengaged, or unlocked, as in FIG. 6, the spool valve 224 may be in the de-stroked position 372. In the illustrative example of FIG. 6, exhaust pressure may be delivered to the torque-transmitting mechanisms C2, C3 and the torque-transmitting mechanisms C2, C3 may be disengaged. In some examples, as in FIG. 6, exhaust pressure may be delivered to the pressure sensors 352, 356, main pressure may be delivered to the pressure sensor 354, and lube pressure may be delivered to the pressure sensor 358. According to some examples the lube regulator valve 252 may be in the stroked position 363, and lube pressure may be routed to the lube cross-section 360.

When the shift valve 265 is in the de-stroked position 269, as in FIG. 6, lube pressure may be routed between the shift valve 265 and the trim valve 248. In some examples, the fluid chamber 271A may be fluidly coupled to the land 375B via the fluid line 274. Additionally, when the shift valve 265 is in the de-stroked position 269 of FIG. 6, exhaust pressure may be routed to the pressure sensor 356. As illustrated in FIG. 6, exhaust pressure may be routed between the shift valve 265 and the shift valve 253 and exhaust pressure may be routed through the orifice 282. In some examples, the fluid chambers 271C, 259C may be fluidly coupled via the fluid lines 278, 286. In some examples, when exhaust pressure is routed between the shift valves 265, 253, exhaust pressure may be routed to the pressure sensor 352. According to some examples, as in FIG. 6, exhaust pressure may be routed between the fluid chamber 271C and the land 267D of the shift valve 265 via the fluid line 280, and exhaust pressure may be routed through the orifice 284.

As illustrated in FIG. 6, when the trim valve 248 is in the de-stroked position 377, exhaust pressure may be routed between the trim valve 248 and the shift valve 265. In some examples, the fluid chambers 281A, 271C may be coupled via the fluid line 296. In some examples, as in FIG. 6, the fluid chamber 281A may be coupled to the land 375C of the trim valve 248 via the fluid lines 296, 298. As in the illustrative example of FIG. 6, exhaust pressure may be delivered between the trim valve 248 and the shift valve 239. In some examples, the fluid chambers 281A and 245 may be fluidly coupled via the fluid line 326. Additionally, when the trim valve 248 is in the de-stroked position 377, as in FIG. 6, exhaust pressure may be routed to the accumulator 350.

More specifically, exhaust pressure may be routed between the output port of the solenoid 250, the accumulator 350, and the land 375A of the trim valve 248.

In the illustrative embodiment of FIG. 6, when the shift valve 253 is in the de-stroked position 257, exhaust pressure may be routed between the shift valve 253 and the torque-transmitting mechanisms C2, C3. For example, the fluid chamber 259B may be coupled to the torque-transmitting mechanism C2 via the fluid line 336 and the fluid chamber 259C may be coupled to the torque-transmitting mechanism C3 via the fluid line 338. In some examples, when the shift valve 253 is in the de-stroked position 257, main pressure may be routed between the solenoid 250 and the shift valve 253. In some examples, main pressure may be routed between the solenoid 250 and the fluid chamber 259A.

Figure 7:
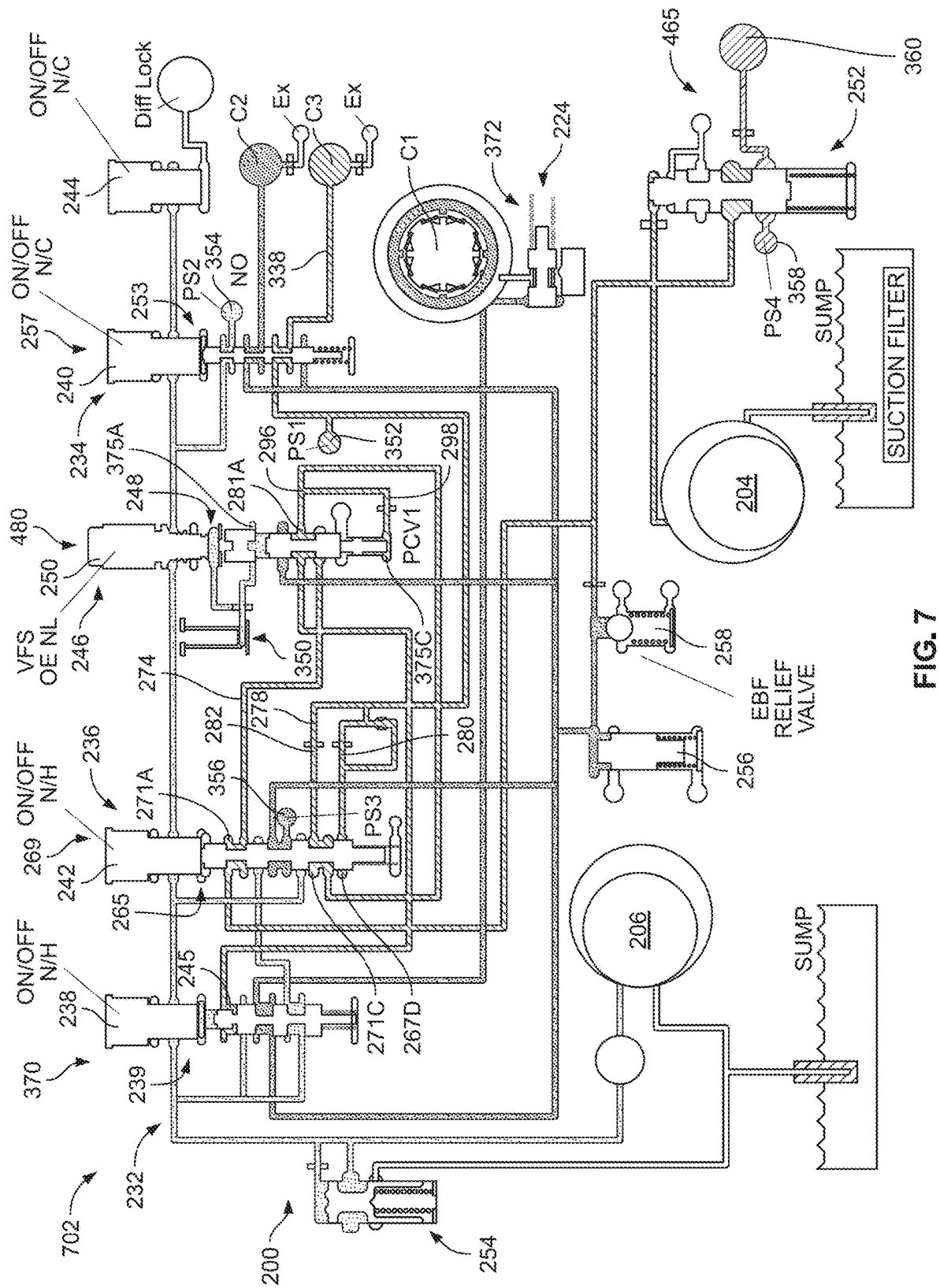
FIG. 7 is a schematic view similar to FIG. 2 showing the electro-hydraulic circuit in a second operational phase of the another multi-phase transition.

Referring now to FIG. 7, the electro-hydraulic circuit 200 is illustrated in phase 702, which may also be referred to as a fifth phase or a fill phase. In some examples, the electro-hydraulic circuit of FIG. 7 may have a similar configuration as the electro-hydraulic circuit 200 of FIG. 4, and one difference between the electro-hydraulic circuit of FIG. 7 and FIG. 4 may be that the shift valve 253 is in the de-stroked position 257 in FIG. 7 rather than the stroked position 450 of FIG. 4. FIG. 7 illustrates an example of one operational phase of the multi-phase transition or shift, wherein lube pressure is routed to the torque-transmitting mechanism C3 and the torque-transmitting mechanism C3 is partially engaged. Also in FIG. 7, exhaust pressure may be routed to the torque-transmitting mechanisms C1, C2, and the torque-transmitting mechanisms C1, C2 may be disengaged. When the torque-transmitting mechanism C1 is disengaged, or unlocked, as in FIG. 7, the spool valve 224 may be in the de-stroked position 372.

In the illustrative example of FIG. 7, the trim solenoid 250 and the solenoid 242 may be energized, and the solenoids 238, 240, and 244 may be de-energized. In some examples, as in FIG. 7, the shift valve 239 and the trim valve 248 may be in the stroked positions 370, 480, and the shift valves 253, 265 may be in de-stroked positions 269, 257. In some examples, lube pressure may be delivered to the pressure sensor 352, main pressure may be delivered to the pressure sensor 354, and exhaust pressure may be delivered to the pressure sensor 356.

Additionally, as illustrated in FIG. 7, lube regulator valve 252 may be in the de-stroked position 465. When the lube regulator valve 252 is in the de-stroked position 465, lube pressure may not be routed to, or may be otherwise cut-off from, the lube cross-section 360 and the pressure sensor 358. In some examples, not routing, or cutting-off, lube pressure to the lube cross-section 360 may result in a transmission 130 that routes lube pressure throughout the electro-hydraulic system 200 faster relative to a similar transmission that routes lube pressure to the lube cross-section 360 during phase 702, and may result in a faster fill phase or a faster completion of phase 702. In some examples, the pressure sensors 352, 358 may indicate the end of the phase 702.

When the trim valve 248 is in the stroked position 480, the trim valve 248 may be fluidly coupled to the shift valve 265. According to some examples, the fluid chamber 281A may be coupled to the fluid chamber 271A via the fluid line 274. In some examples, as in FIG. 7, lube pressure may also be routed between the trim valve 248 and the shift valve 265 via the fluid line 296, which may fluidly couple the fluid chambers 281A, 271C. When the trim valve 248 is in the stroked position 480 and the shift valve 265 is in the de-stroked position 269, lube pressure may be routed from one portion of the trim valve 248 to another portion of the trim valve 248. For example, as in FIG. 7, lube pressure may be routed between the fluid channels 281A, 375C via the fluid lines 296, 298. According to some examples, as in FIG. 7, when the trim valve 248 is in the stroked position 480, main pressure may be routed to the accumulator 350. More specifically, main pressure may be routed between the output port of the solenoid 250, the accumulator 350, and the land 375A of the trim valve 248.

As illustrated in FIG. 7, when the trim valve 248 is in the stroked position 480 and the shift valve 265 is in the de-stroked position 269, lube pressure may be routed between the trim valve 248 and the shift valve 239. In some examples, the fluid chambers 281A, 245 may be fluidly coupled via the fluid line 326. Additionally, when the trim valve 248 is in the stroked position 480 and the shift valve 265 is in the de-stroked position 269, lube pressure may be routed between the shift valves 265 253. In some examples, as in FIG. 7, lube pressure may be routed between the fluid chamber 271C and the fluid chamber 259C via the fluid lines 278, 286, and fluid may be routed through the orifice 282. Further, when the trim valve 248 is in the stroked position 480 and the shift valve 265 is in the de-stroked position 269, lube pressure may be routed to the pressure sensor 352. In some examples, as in FIG. 7, lube pressure may be routed between the fluid chambers 271C, 267D of shift valve 265 via the fluid lines 278, 280.

As illustrated in FIG. 7, when the shift valve 239 and the trim valve 248 are in the stroked position 370, 480, and the shift valves 253, 265 are in the de-stroked position 257, 269, lube pressure may be delivered to the torque-transmitting mechanism C3. In some examples, the fluid chamber 259C may route lube pressure to the third torque-transmitting mechanism C3 via the fluid line 338. In some examples, when the shift valve 253 is in the de-stroked position 257, main pressure may be routed between the solenoid 250 and the shift valve 253. In some examples, main pressure may be routed between the solenoid 250 and the fluid chamber 259A, and main pressure may also be routed to the pressure sensor 354.

Referring now to FIG. 8, the electro-hydraulic circuit 200 is illustrated in phase 801, which may also be referred to as a sixth phase or a shift complete phase. In some examples, the electro-hydraulic circuit of FIG. 8 may have a similar configuration as the electro-hydraulic circuit 200 of FIG. 5, and one difference between the electro-hydraulic circuit 200 of FIGS. 5 and 8 may be that the shift valve 253 may be in the de-stroked position 257 in FIG. 8 rather than the stroked position 450 of FIG. 5. The phase 801 is an example of one operational phase of the multi-phase transition or shift, wherein main pressure is routed to the torque-transmitting mechanism C3 and the torque-transmitting mechanism C3 is in an engaged state. In some examples, exhaust may be delivered to the torque-transmitting mechanisms C1, C2, and the torque-transmitting mechanisms C1, C2 may be in the disengaged state. In some embodiments, the spool valve 224 may be in the de-stroked position 372 and the torque-transmitting mechanism C1 may be unlocked.

According to some examples, the solenoids 238, 240, 242, 244 may be de-energized, and the trim solenoid 250 may be energized. In the illustrative example of FIG. 8, the shift valve 239, 265 and the trim valve 248 may be in stroked positions 370, 570, 480 and the shift valve 253 may be in the de-stroked position 257. In the illustrative example of FIG. 8, main pressure may be delivered to the pressure sensors 352, 354, 356. According to some examples the lube regulator valve 252 may be in the stroked position 363, and lube pressure may be routed to the lube cross-section 360 and to the pressure sensor 358.

When the shift valve 265 is in the stroked position 570, as in FIG. 8, main pressure may be routed between the shift valve 265 and the trim valve 248. Specifically, the fluid chamber 271A may be fluidly coupled to the fluid chamber 281A via the fluid line 274. In some examples, the shift valve 265 may be fluidly coupled to the shift valve 253. More specifically, main pressure may be routed between the fluid chambers 271C, 259C via the fluid lines 280, 286, and main pressure may be routed through the orifice 284. In some embodiments, when main pressure is routed between the shift valves 265, 253, main pressure may be routed to the pressure sensor 352. In the illustrative example of FIG. 8, the shift valve 253 may be fluidly coupled to the torque-transmitting mechanism C3 and the fluid channel 259C may route high pressure to the torque-transmitting mechanism C3 via the fluid line 338.

As illustrated in FIG. 8, main pressure may be routed between the fluid chamber 271C and the land 267C of the shift valve 265 via the fluid lines 280, 278. In the illustrative embodiment of FIG. 8, when the shift valve 265 is in the stroked position 570, main pressure may be routed between the solenoid 238 and the fluid channel 271B of the shift valve 265 and the pressure sensor 356. When the shift valve 265 is in the stroked position 570, as in FIG. 8, main pressure may be routed between the shift valve 265 and the trim valve 248 via the fluid line 296. In some examples, as in FIG. 8, the fluid line 296 may fluidly couple the fluid chambers 271C, 281A. In the illustrative example of FIG. 8, main pressure may be routed between the trim valve 248 and the shift valve 239. In some examples, the fluid chamber 281A may be fluidly coupled to the fluid chamber 245 via the fluid line 326. In some examples, as in FIG. 8, main pressure may also be routed between the fluid chambers 281A, 375C of the trim valve 248 via the fluid lines 296, 298.

Referring now to FIG. 9, one example of an electro-hydraulic control system 900 is illustrated. The electro-hydraulic control system 900 may include a controller 902, and the controller 902 may be coupled to one or more torque-transmitting mechanisms 904, a plurality of valves 806, switches and/or sensors 908, solenoids 910, and a plurality of pumps 912.

The controller 902 may include a memory unit 914, and may be microprocessor-based. The memory unit 914 may generally include instructions stored therein that are executable by a processor 916 of the controller 902 to control operation of the transmission, i.e., shifting between the various gears. It will be understood, however, that this disclosure contemplates other embodiments in which the controller 902 is not microprocessor-based, but is configured to control operation of the torque converter and/or transmission based on one or more sets of hardwired instructions and/or software instructions stored in the memory unit 914.

The processor 916 of the illustrative controller 902 may be embodied as, or otherwise include, any type of processor, controller, or other compute circuit capable of performing various tasks such as compute functions and/or controlling the functions of the transmission 130. For example, the processor 916 may be embodied as a single or multi-core processor(s), a microcontroller, or other processor or processing/controlling circuit. In some embodiments, the processor 916 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 916 may be embodied as, or otherwise include, a high-power processor, an accelerator co-processor, or a storage controller. In some embodiments still, the processor 916 may include more than one processor, controller, or compute circuit.

The memory unit 914 of the illustrative controller 902 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 914 may be embodied as a block addressable memory, such as those based on NAND or NOR technologies. The memory device 914 may also include future generation nonvolatile devices, such as a three dimensional crosspoint memory device (e.g., Intel 3D XPoint™ memory), or other byte addressable write-in-place nonvolatile memory devices. In some embodiments, the memory device 914 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The controller 902 may be coupled to the one or more torque-transmitting mechanisms 904, which in some examples may include a clutch. In the illustrative example of FIG. 9, the controller 902 may be coupled to the torque-transmitting mechanisms C1, C2, C3. According to some examples the torque-transmitting mechanisms C1, C2, C3 may include a sensor or another device communicatively coupled to the controller 902 that may be configured to communicate information to the controller 902 such as, for example, diagnostics. In some examples, the controller 902 may be coupled to the one or more valves 906. According to some examples, the controller 902 may be coupled to the shift valves 239, 253, 264 and the trim valve 248 which in some examples may be a pressure control valve. In some examples, as in FIG. 9, the controller 902 may be coupled to the lube regulator valve 252, the main regulator valve 254, the EBF valve 256, and the EBF relief valve 258. According to some embodiments, the controller 902 may move the valves 906 between stroked and de-stroked positions.

The controller 902 may also be coupled to switches and/or sensors 908. The switches and/or sensors may include the pressure sensors 352, 354, 356, 358, and the position sensor 226. In some examples, the pressure sensors 352, 354, 356, 358 may be configured to detect pressure. In some examples, the pressure sensors 352, 354, 356, 358 may be switches, and the switches may communicate a signal to the controller 902. In some examples, the signal may indicate that a threshold pressure has been reached. The position sensor 226 may be configured to detect the position of the a valve. According to some embodiments, the position sensor 226 may communicate a signal to the controller 902. In some embodiments, the position sensor 226 may detect when the torque-transmitting mechanism C1 is in the unlocked or locked position.

Still referring to FIG. 9, the controller 902 may be coupled to the solenoids 910. The solenoids 910 may include the solenoids 238, 240, 242, 244, 250. In some examples, the controller 902 may turn on, or energize one or more of the solenoids 238, 240, 242, 244, 250, or may turn off, or de-energize one or more of the solenoids 238, 240, 242, 244, 250. The controller 902 may also be coupled to the plurality of pumps 912. The plurality of pumps may include the pumps 204, 206. In some examples, the controller 902 may be configured to control whether the pump 204 is operable, or pumping, and whether the pump 206 is inoperable, or not pumping. It will be understood that this disclosure contemplates other embodiments in which the electro-hydraulic control system 900 includes additional components or groups of components, and the controller is coupled to additional components or groups of components.

Figure 10:
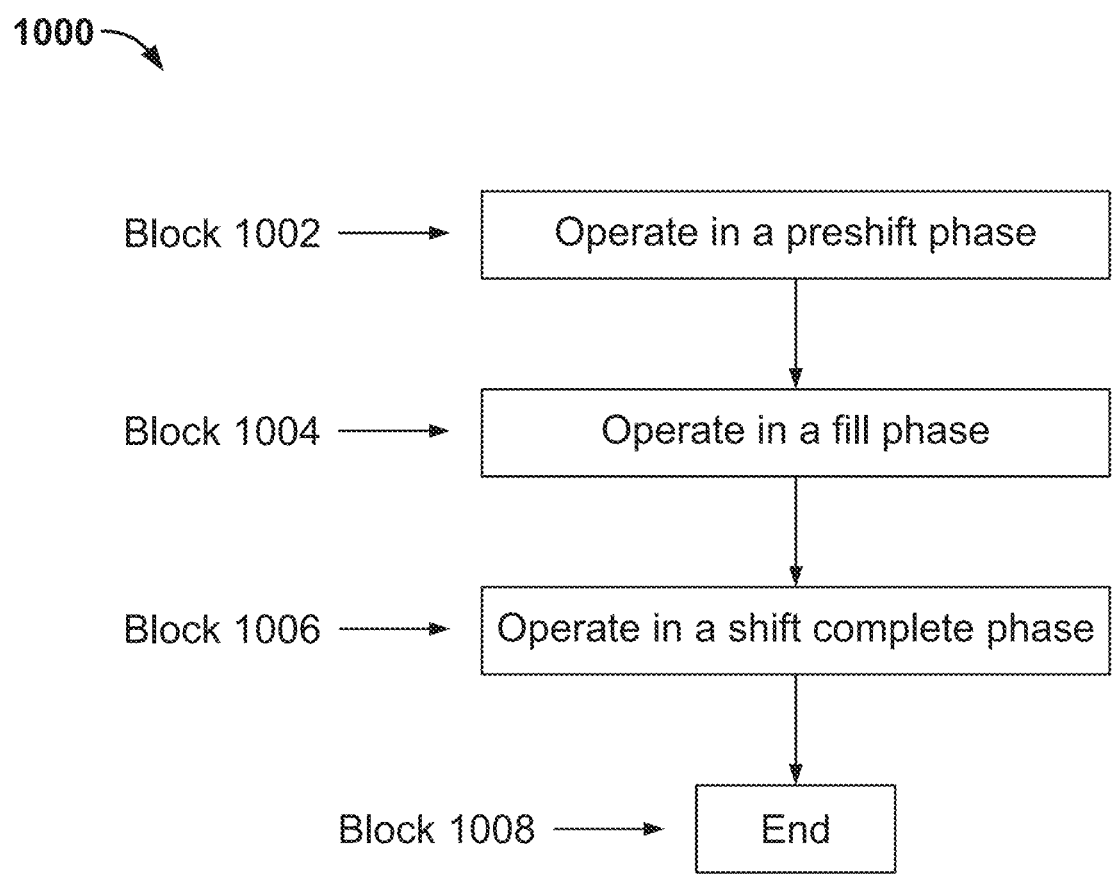
FIG. 10 is a simplified flowchart of a method of supplying fluid to a torque-transmitting mechanism.
Figure 11:
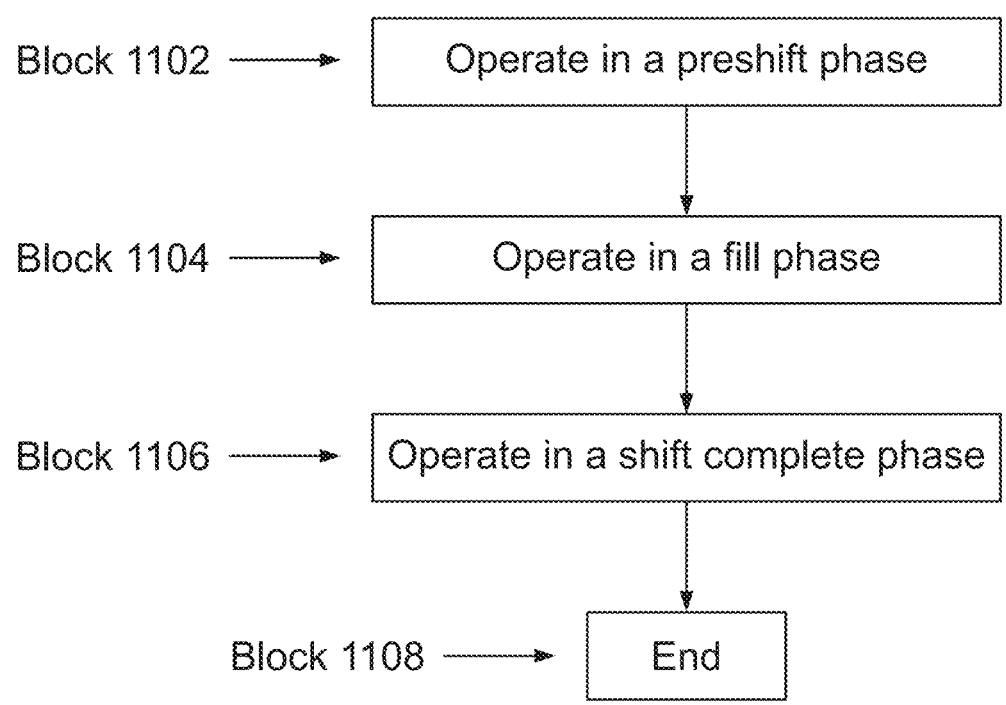
FIG. 11 is a simplified flowchart of a method of supplying fluid to another torque-transmitting mechanism.

Referring now to FIGS. 10-11, methods 1000, 1100 of supplying fluid to a torque-transmitting mechanism are illustrated. More specifically, FIG. 10 illustrates a method 1000 for engaging the torque-transmitting mechanism C2, and FIG. 11 illustrates a method 1100 for engaging the torque-transmitting mechanism C3.

Method 1000 may start with block 1002, wherein the electrohydraulic circuit 200 may operate in a preshift phase. In some examples, exhaust fluid may be delivered to the torque-transmitting mechanism C1, C2, C3 and the torque-transmitting mechanisms C1, C2, C3 may be disengaged in the preshift phase of block 1002. In some examples, the preshift phase of block 1002 may be illustrated in FIG. 3. In block 1004, the electrohydraulic circuit 200 may operate in a fill phase. According to some examples, the lube pressure may be delivered to the torque-transmitting mechanism C2, and the torque-transmitting mechanism C2 may be partially engaged in the fill phase of block 1004. In some examples, in the fill phase of block 1004, exhaust pressure may be delivered to the torque-transmitting mechanisms C1, C3 and the torque-transmitting mechanisms may be disengaged. In some embodiments, the fill phase of block 1004 may be illustrated in FIG. 4. In block 1006, the electrohydraulic circuit 200 may operate in a shift complete phase. In some examples, in the shift complete phase of block 1008, main pressure may be delivered to the torque-transmitting mechanism C2 and exhaust pressure may be delivered to torque-transmitting mechanisms C1, C3. In these examples, the torque-transmitting mechanism C2 may be engaged, and the torque-transmitting mechanisms C1, C3 may be disengaged. In some embodiments, the shift complete phase of block 1008 may be illustrated in FIG. 5. In some examples, the method 1000 may advance to block 1008 and end.

The method 1100 may be similar to the method 1000, and in method 1100 fluid may be delivered to the torque-transmitting mechanism C3 rather than the torque-transmitting mechanism C2 of method 1000. Method 1100 may start with block 1102, wherein the electrohydraulic circuit 200 may operate in a preshift phase. In some examples, exhaust fluid may be delivered to the torque-transmitting mechanism C1, C2, C3 and the torque-transmitting mechanisms C1, C2, C3 may be disengaged in the preshift phase of block 1102. In some embodiments, the preshift phase of block 1102 may be illustrated in FIG. 6. In block 1104, the electrohydraulic circuit 200 may operate in a fill phase. In some examples, in the fill phase of block 1104, lube pressure may be delivered to the torque-transmitting mechanism C2, and the torque-transmitting mechanism C2 may be partially engaged. According to some examples, in the fill phase of block 1104, exhaust pressure may be delivered to the torque-transmitting mechanisms C1, C3 and the torque-transmitting mechanisms may be disengaged. In some examples, the fill phase of block 1104 may be illustrated in FIG. 7. In block 1106, the electrohydraulic circuit 200 may operate in a shift complete phase. In the shift complete phase of block 1108, main pressure may be delivered to the torque-transmitting mechanism C2 and exhaust pressure may be delivered to torque-transmitting mechanisms C1, C3. In these examples, the torque-transmitting mechanism C2 may be engaged, and the torque-transmitting mechanisms C1, C3 may be disengaged. In some examples, the shift complete phase of block 1108 may be illustrated in FIG. 8. In some examples, the method 1100 may advance to block 1108 and end.

The methods 1000, 1100 may include any number of blocks and the blocks may be executed in any order. In some implementations, there may be more or less blocks than those illustrated in FIGS. 10-11.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A vehicle comprising:
   a chassis;
   a plurality of wheels coupled to the chassis; and
   a transmission coupled to the chassis including an electro-hydraulic circuit that comprises
   at least one torque-transmitting mechanism selectively engageable in response to one or more fluid pressures applied thereto,
   a first pump to selectively deliver fluid pressure to the at least one torque-transmitting mechanism at a first pressure,
   a second pump to selectively deliver fluid pressure to the at least one torque-transmitting mechanism at a second pressure greater than the first pressure, and
   an electro-hydraulic control system to control delivery of fluid pressure from the first pump and the second pump to the at least one torque-transmitting mechanism in a plurality of operating modes of the transmission,
wherein the electro-hydraulic control system includes a controller having a processor and memory having instructions stored therein, and wherein the instructions are executable by the processor to cause the processor to (i) direct delivery of fluid pressure at the first pressure from the first pump to the at least one torque-transmitting mechanism during a first phase of a multi-phase transition from one operating mode of the transmission to another operating mode of the transmission and (ii) direct delivery of fluid pressure at the second pressure from the second pump to the at least one torque-transmitting mechanism during a second phase of the multi-phase transition following the first phase, and
wherein the instructions are executable by the processor to cause the processor to direct exhaustion of at least one clutch during each of the first and second phases of the multi-phase transition.

2. The vehicle of claim 1, wherein during the multi-phase transition, the first pressure is delivered by the first pump to the at least one torque-transmitting mechanism at a first flow rate and the second pressure is delivered by the second pump to the at least one torque-transmitting mechanism at a second flow rate that is less than the first flow rate.

3. The vehicle of claim 1, wherein each of the first and second pumps is an electric pump.

4. The vehicle of claim 3, wherein the vehicle is an electric vehicle.

5. The vehicle of claim 1, wherein the multi-phase transition includes three discrete phases.

6. The vehicle of claim 5, wherein the instructions are executable by the processor to cause the processor to direct performance of a third phase of the multi-phase transition before performance of the first and second phases.

7. The vehicle of claim 6, wherein the instructions are executable by the processor to cause the processor to direct exhaustion of the at least one torque-transmitting mechanism during the third phase of the multi-phase transition.

8. The vehicle of claim 1, wherein:
the at least one torque-transmitting mechanism comprises a plurality of clutches.

9. The vehicle of claim 1, wherein the electro-hydraulic circuit further comprises one trim system including a solenoid and a trim valve having a valve element configured for axial translation in response to one or more control signals provided from the controller to the solenoid, and wherein the vehicle includes no more than one trim system.

10. The vehicle of claim 9, wherein the instructions are executable by the processor to cause the processor to energize the pressure control solenoid such that the trim valve is in a stroked position in each of the phases of the multi-phase transition.

11. A transmission comprising an electro-hydraulic circuit comprising:
at least one torque-transmitting mechanism selectively engageable in response to one or more fluid pressures applied thereto;
a first pump to selectively deliver fluid pressure to the at least one torque-transmitting mechanism at a first pressure;
a second pump to selectively deliver fluid pressure to the at least one torque-transmitting mechanism at a second pressure greater than the first pressure; and
an electro-hydraulic control system including a controller having a processor and memory having instructions stored therein, and wherein the instructions are executable by the processor to cause the processor to (i) direct delivery of fluid pressure at the first pressure from the first pump to the at least one torque-transmitting mechanism during a first phase of a multi-phase transition from one operating mode of the transmission to another operating mode of the transmission and (ii) direct delivery of fluid pressure at the second pressure from the second pump to the at least one torque-transmitting mechanism during a second phase of the multi-phase transition,
wherein during the multi-phase transition, the first pressure is delivered by the first pump to the at least one torque-transmitting mechanism at a first flow rate and the second pressure is delivered by the second pump to the at least one torque-transmitting mechanism at a second flow rate that is less than the first flow rate.

12. The transmission of claim 11, wherein each of the first and second pumps is an electric pump.

13. The transmission of claim 11, wherein the instructions are executable by the processor to cause the processor to direct performance of a pre-shift phase of the multi-phase transition before performance of the first and second phases.

14. The transmission of claim 11, wherein:
the at least one torque-transmitting mechanism comprises a first clutch, a second clutch, and a third clutch, and
only one of the first clutch, the second clutch, and the third clutch is a one-way clutch.

15. The transmission of claim 11, wherein the electro-hydraulic circuit further comprises one trim system including a pressure control solenoid and a trim valve having a valve element configured for axial translation in response to one or more control signals provided from the controller to the pressure control solenoid.

16. A method of operating a transmission, the method comprising:
delivering, during a first phase of a multi-phase transition from one operating mode of the transmission to another operating mode of the transmission, fluid pressure from a first pump of an electro-hydraulic circuit of the transmission to at least one torque-transmitting mechanism of the electro-hydraulic circuit at a first pressure and at a first flow rate; and
delivering, during a second phase of the multi-phase transition following the first phase, fluid pressure from a second pump of the electro-hydraulic circuit to the at least one torque-transmitting mechanism at a second pressure greater than the first pressure and at a second flow rate less than the first flow rate.

17. The method of claim 16, further comprising exhausting, during a pre-shift phase of the multi-phase transition prior to each of the first and second phases, the at least one torque-transmitting mechanism.

18. The method of claim 17, wherein the multi-phase transition includes three discrete phases.

* * * * *